(12) United States Patent
Usami

(10) Patent No.: US 7,742,379 B2
(45) Date of Patent: Jun. 22, 2010

(54) OPTICAL RECORDING METHOD, OPTICAL RECORDING APPARATUS, OPTICAL RECORDING MEDIUM, AND OPTICAL REPRODUCING METHOD

(75) Inventor: Yoshihisa Usami, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 829 days.

(21) Appl. No.: 11/508,175

(22) Filed: Aug. 23, 2006

(65) Prior Publication Data
US 2007/0047419 A1    Mar. 1, 2007

(30) Foreign Application Priority Data
Aug. 24, 2005  (JP)  ............... 2005-243473

(51) Int. Cl.
*G11B 7/00* (2006.01)
(52) U.S. Cl. ............... 369/103; 369/53.19; 369/112.01
(58) Field of Classification Search ............ 369/103, 369/53.19, 112.01, 112.08; 359/8
See application file for complete search history.

(56) References Cited

U.S. PATENT DOCUMENTS

| 6,064,586 | A | 5/2000 | Snyder et al. | |
|---|---|---|---|---|
| 7,440,381 | B2 * | 10/2008 | Kimura et al. | 369/112.01 |
| 7,626,911 | B2 * | 12/2009 | Hayashi et al. | 369/103 |
| 2002/0012313 | A1 * | 1/2002 | Kimura et al. | 369/112.08 |
| 2004/0037196 | A1 * | 2/2004 | Matsumoto et al. | 369/53.19 |
| 2004/0184382 | A1 * | 9/2004 | Horimai et al. | 369/103 |
| 2005/0111335 | A1 * | 5/2005 | Kasazumi et al. | 369/103 |
| 2005/0147013 | A1 | 7/2005 | Tateishi et al. | |
| 2005/0195722 | A1 * | 9/2005 | Tsukamoto et al. | 369/103 |
| 2005/0206984 | A1 * | 9/2005 | Kawano et al. | 359/8 |
| 2007/0177481 | A1 * | 8/2007 | Kimura et al. | 369/112.01 |

FOREIGN PATENT DOCUMENTS

| EP | 1 065 658 A1 | 1/2001 |
|---|---|---|
| EP | 1 519 368 A | 3/2005 |
| EP | 1 562 185 A | 8/2005 |
| JP | 2003-151143 | 5/2003 |
| JP | 2003-178456 | 6/2003 |
| JP | 2003-228875 | 8/2003 |
| WO | WO 97/43669 A | 11/1997 |
| WO | WO 2004/070714 A | 8/2004 |

* cited by examiner

*Primary Examiner*—Thuy N Pardo
(74) *Attorney, Agent, or Firm*—Sughrue Mion, PLLC

(57) ABSTRACT

There are provided: an optical recording method containing a deviation detecting step, a horizontal location controlling step, and an interference image recording step; an optical recording apparatus containing a derivation detecting unit, a horizontal location controlling unit, and an interference image recording unit; an optical recording medium recorded in accordance with the optical recording method; and an optical reproducing method reproducing a recorded information recorded in accordance with the optical recording method.

20 Claims, 9 Drawing Sheets

Address 0000

Address 0001

Address 0001

ΔL

ΔL Offset Recording

OPTICAL RECORDING METHOD, OPTICAL RECORDING APPARATUS, OPTICAL RECORDING MEDIUM, AND OPTICAL REPRODUCING METHOD

BACKGROUND OF THE INVENTION

1. Field of the Invention

The present invention relates to an optical recording method for recording information by holography, an optical recording apparatus using the method, an optical recording medium, an optical reproducing method, using the optical recording method. More specifically, the present invention relates to an optical recording method capable of effectively adjusting the amount of deviation of the optical axes of a plurality of laser beams, in which the deviation is attributed to variations in recording accuracy of an optical recording apparatus, upon recording or reproducing of information on or from an optical recording medium or focusing control and/or tracking control on the optical recording medium by means of the laser beams, and the present invention relates to an optical recording apparatus, an optical recording medium, and an optical reproducing method using the method.

2. Description of the Related Art

An optical recording method for recording information on an optical recording medium by holography generally involves interference of information light (object light) having image information with reference light in an optical recording medium to record a resultant interference fringe on the optical recording medium. An example of such an optical recording method is a collinear strategy in which information light and reference light are collinearly applied. In this collinear strategy an interference fringe is formed as a result of interference between the information light and the reference light, recording image information or the like in its recording layers. The recorded information is reproduced by applying reference light identical to that for recording from the same direction to thereby produce diffracted light from the interference fringe and by receiving the diffracted light.

Upon recording or reproducing of image information or the like, controls of light focus points (e.g., focusing and tracking controls) are carried out for recording/reproducing information on/from a proper position of an optical recording medium, by adjusting variations in distance within a layer (e.g., recording layer) in the optical recording medium and/or variations in recording accuracy of the optical recording apparatus.

As a method for adjusting focus points, for example, a sampled servo method is available. In the sampled servo method, servo light is applied on an optical recording medium for focusing and tracking, and reflected light is utilized to detect location information such as focusing information and/or tracking information for proper light irradiation. This focus point control allows application of the information light and the reference light on the exact location on the optical recording medium, thereby recording or reproducing information (see Japanese Patent Application Laid-Open (JP-A) Nos. 2003-151143, 2003-178456 and 2003-228875).

However, on the aforementioned focusing adjustment method, the detection is targeted only to the location information (e.g., the focusing information and the tracking information) of the servo light irradiation, and the applying location of the information light and the reference light in the recording layer is not regarded as a target of the detection. Therefore, there is a problem in the optical recording and reproducing apparatus which performs recording, reproducing, focusing control, and tracking control using a plurality of laser beams including not only information light and reference light, but also servo light as in the aforementioned positioning control method, such that even the focusing control or tracking control is performed, as shown in FIG. 3, the information is recorded in a location sifted from the proper location in the optical recording medium 20, when there is an error caused between the optical axis of a laser beam 33 for location control, such as servo light, and the optical axis of a laser beam 35 for recording and reproducing (gap between the optical axis of the laser beam 33 and the optical axis of the laser beam 35) at the time of manufacturing process, as shown in FIG. 1. Ideally, the optical axis of the laser beam 33 and the optical axis of the laser beam 35 are applied at the appropriate reproduction location, namely being applied collinearly, as shown in FIG. 2.

In the case where the aforementioned gap (also referred as "deviation" hereinafter) is large when the optical recording medium 20 in which the recorded location is sifted as shown in FIG. 3 is reproduced by means of another optical reproducing apparatus, or in the case where there is a gap, i.e., deviation between the optical axes of the reproduction light 35 and servo light 33 for use in the optical reproducing apparatus as shown in FIG. 4, the reproduction light 35 is not correctly applied to the information recorded part (the oblique lined portion in FIG. 4) in the optical recording medium 20, and thus the information recorded on the optical recording medium 20 cannot be reproduced.

Therefore, in the same optical recording and reproducing apparatus, even if the recording and reproducing can be properly performed on one optical recording medium, the reproducing may not be properly performed on another optical recording medium, and thus there is a problem in compatibility, such that the adjustment of the optical recording and reproducing apparatus is required. Since there is a limitation in reducing an error of the optical recording and reproducing apparatus, the manufacturing cost may be increased as a result of seeking such the highly accurate optical recording and reproducing apparatus.

Therefore, there are not yet realized an excellent optical recording method, optical recording apparatus, optical recording medium, and optical reproducing method, which are capable of efficiently adjusting the deviation of the optical axes of the plurality of the laser beams caused by an error or the like of the optical recording, and optical reproducing apparatuses when recording, reproducing, focusing control or tracking control is performed by the plurality of laser beams on an optical recording medium which is recorded by holography. Accordingly, it is strongly desired to provide such that optical recording method, optical recording apparatus, optical recording medium, and optical reproducing method.

SUMMARY OF THE INVENTION

The present invention is aimed at solving the aforementioned problems in the related art, and achieving the following objects.

Namely, an object of the present invention is to provide an excellent optical recording method, optical recording apparatus, optical recording medium, and optical reproducing method, which are capable of efficiently adjusting the deviation of the optical axes of a plurality of laser beams, e.g., servo light, information light, and reference light, caused by an error or the like of the optical recording, and optical reproducing apparatuses when recording, reproducing, focusing control or tracking control is performed by the plurality of laser beams.

The optical recording method of the present invention contains: applying information light and/or reference light to a location information pattern in an optical recording medium so as to detect a horizontal location of an optical axis of the information light and/or the reference light relative to the optical recording medium; detecting a deviation $\Delta L$ in a horizontal direction between the horizontal location of the optical axis of the information light and/or the reference light, and an address detected by servo light; in the case where the deviation $\Delta L$ is more than 0, shifting the information light and/or the reference light at $\Delta L$ so that a location of the optical axis of the information light and/or the reference light is matched to a location of the address; and applying the information light and the reference light to a recording layer of the optical recording medium so as to form an interference image, and recording the interference image on the recording layer. In the optical recording method of the present invention, the optical recording medium contains the recording layer for a holographic recording, and the location information pattern which stores horizontal location information relative to a surface of the recording layer.

The optical recording apparatus of the present invention contains: a deviation detecting unit which is configured to apply information light and/or reference light to a location information pattern in an optical recording medium so as to detect a horizontal location of an optical axis of the information light and/or the reference light relative to the optical recording medium, and is configured to detect a deviation $\Delta L$ in a horizontal direction between the horizontal location of the optical axis of the information light and/or the reference light, and an address detected by servo light; a horizontal location controlling unit which is configured to control a horizontal location of the optical axes of the information light and the reference light based upon the detected deviation $\Delta L$; and an interference image recording unit which is configured to apply the information light and the reference light to a recording layer of the optical recording medium at the location controlled by the horizontal location controlling unit so as to form an interference image, and is configured to record the interference image on the recording layer. In the optical recording apparatus of the present invention, the optical recording medium contains the recording layer for a holographic recording, and the location information pattern which stores horizontal location information relative to a surface of the recording layer.

The optical recording medium of the present invention contains a recording layer for a holographic recording, and a location information pattern storing horizontal location information relative to a surface of the recording layer, wherein the optical recording medium is recorded by the optical recording method of the present invention.

The optical reproducing method of the present invention contains applying reference light to an interference image recorded on a recording layer of an optical recording medium so as to reproduce recorded information corresponding to the interference image, wherein the interference image is recorded on the recording layer by the optical recording method of the present invention.

Figure 1:
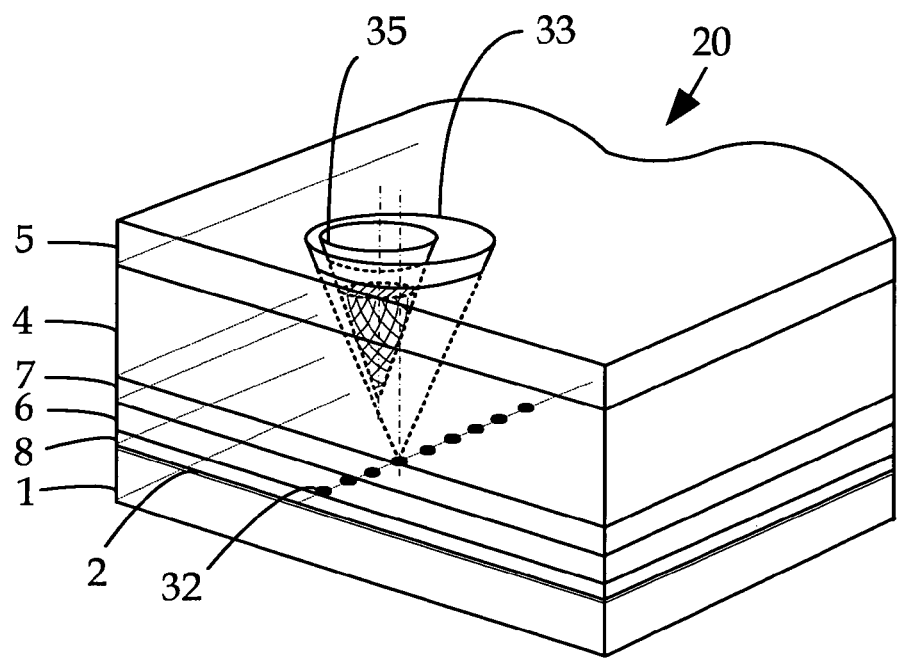
FIG. 1 is a schematic perspective diagram showing a deviation between an optical axis of servo light and optical axes of information light and reference light.
Figure 2:
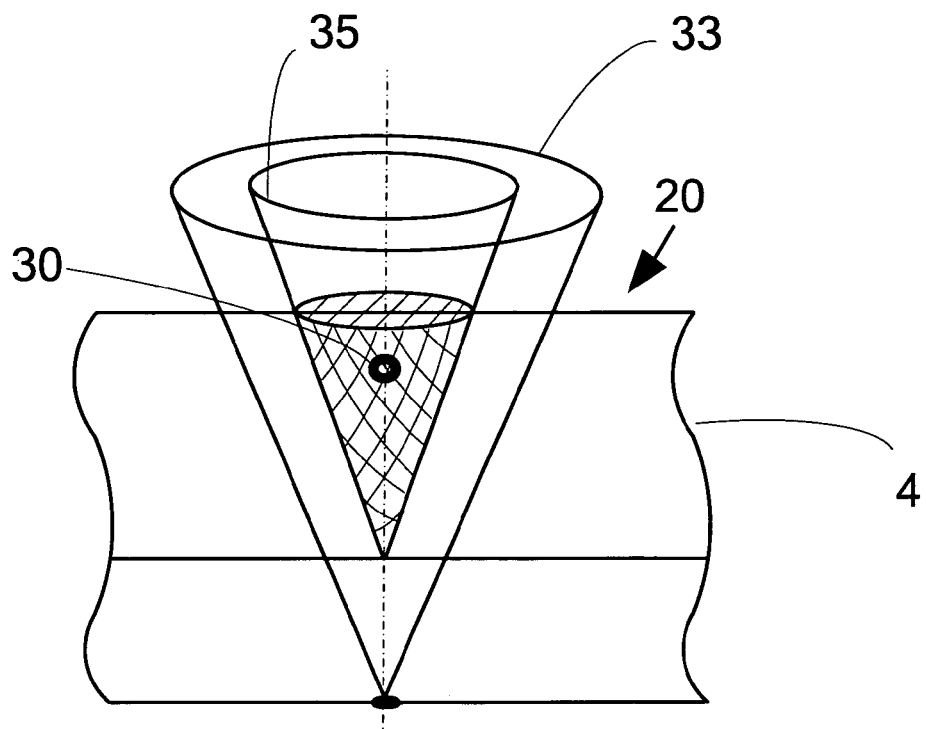
FIG. 2 is a partial perspective diagram showing a condition where an optical axis of servo light and an optical axe(s) of information light and/or reference light (light for reproducing a location information pattern) are collinearly oriented.
Figure 3:
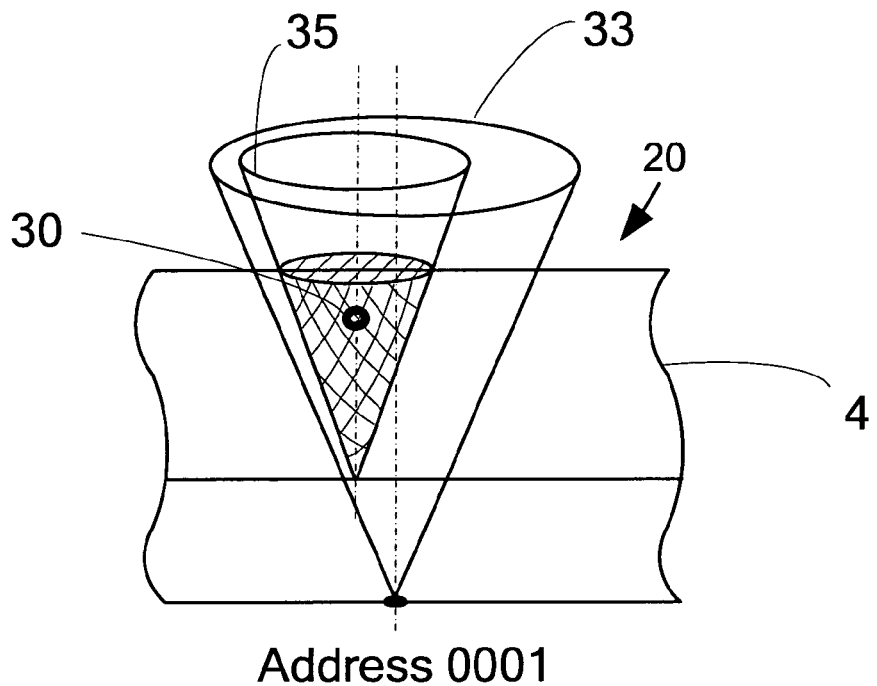
FIG. 3 is a partial perspective diagram showing a deviation between an optical axis of servo light and an optical axis of information light.
Figure 4:
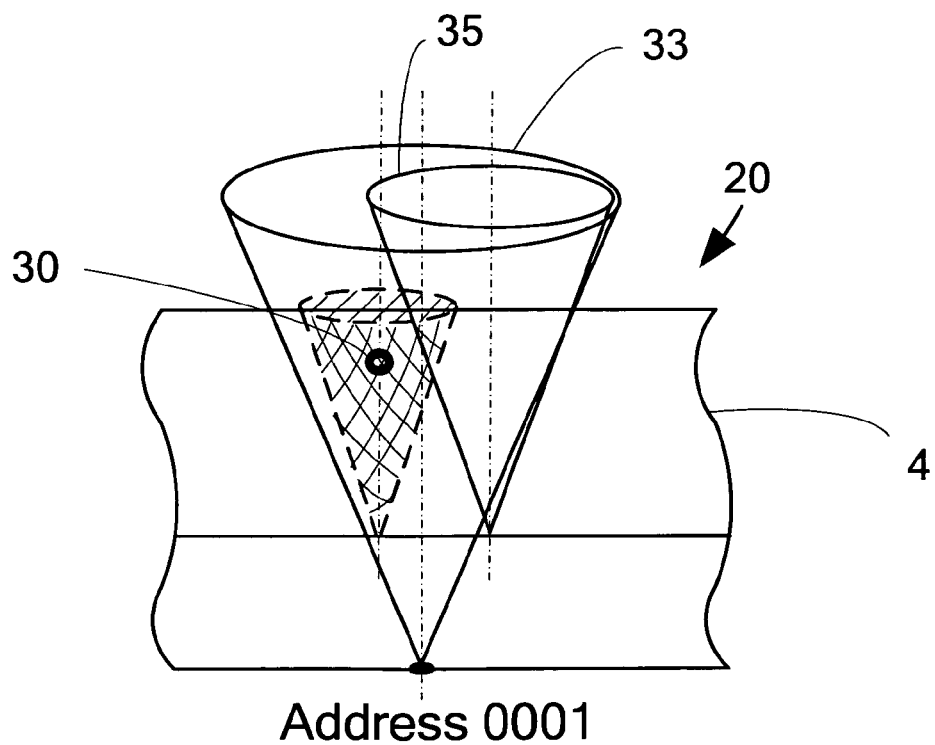
FIG. 4 is a partial perspective diagram showing a deviation between an optical axis of servo light and an optical axis of reproduction light.

DESCRIPTION OF THE PREFERRED EMBODIMENTS (Optical Recording Method and Optical Recording Apparatus)

The optical recording method of the present invention contains a deviation detecting step, a horizontal location controlling step, and an interference image recording step, and optionally contains appropriately selected other steps, if necessary.

The optical recording apparatus of the present invention contains a deviation detecting unit, a horizontal location controlling unit, and an interference image recording unit, and optionally contains appropriately selected other units, if necessary.

The deviation detecting step is a step of applying information light and/or reference light to a location information pattern in an optical recording medium so as to detect a horizontal location of an optical axis of the information light and/or the reference light relative to the optical recording medium, and detecting a deviation $\Delta L$ in a horizontal direction between the horizontal location of the optical axis of the information light and/or the reference light, and an address detected by servo light.

The horizontal location controlling step is a step of, in case where the deviation $\Delta L$ is more than 0, shifting the information light and/or the reference light at $\Delta L$ in the horizontal direction so that a location of the optical axis of the information light and/or the reference light is matched with a location of the address.

The interference image recording step is a step of applying the information light and the reference light to a recording layer of the optical recording medium so as to form an interference image, and recording the interference image on the recording layer.

The optical recording method of the present invention can be performed by means of the optical recording apparatus of the present invention, and thus the details thereof will be explained through the explanations of the optical recording apparatus.

The deviation detecting step of the optical recording method of the present invention is suitably performed by means of the deviation detecting unit of the optical recording apparatus of the present invention. The horizontal location controlling step of the optical recording method of the present invention is suitably performed by means of the horizontal location controlling unit of the optical recording apparatus of the present invention. The interference image recording step of the optical recording method of the present invention is suitably performed by means of the interference image recording unit of the optical recording apparatus of the present invention. The aforementioned other steps which are optionally contained in the optical recording method of the present invention are suitably performed by means of other units equipped with the optical recording apparatus of the present invention.

<Deviation Detecting Unit>

The deviation detecting unit is configured to apply information light and/or reference light to a location information pattern in an optical recording medium so as to detect a horizontal location of an optical axis of the information light and/or the reference light relative to the optical recording medium, and is configured to detect a deviation ΔL in a horizontal direction between the horizontal location of the optical axis of the information light and/or the reference light, and an address detected by servo light. The aforementioned optical recording medium contains a recording layer for a holographic recording, and the location information pattern which stores horizontal location information relative to a surface of the recording layer.

—Horizontal Location Information—

The horizontal location information stored on the optical recording medium is not particularly limited provided that it is information related to a horizontal location of an optical axis of the information light and/or the reference light relative to a surface of the recording layer disposed in the optical recording medium, and can be appropriately selected depending on the intended purpose. For example, the horizontal location information is a location (a, b, c), which is "a" from X-axis, "b" from Y-axis, and "c" from Z-axis. Here, address information recorded in the pre-pit region or in the recording layer of the optical recording medium is utilized, and an arbitrarily selected address from the address information is determined as a starting point. The X-axis and Y-axis are taken on a surface horizontal to the recording layer, and the Z-axis is takes along the thickness direction of the recording layer. Note that, "a" is a $\geq 0$, "b" is b $\geq 0$, and "c" is c >0. In the case where a=0, and b=0, the location is different from the address location only in terms of the thickness direction of the recording layer, and thus it is preferable for the detecting whether or not the optical axis of the servo light, and the optical axes of the information light and/or the reference light matched to each other. Other examples of the horizontal location information include location information used for tracking servo, location information using location information formed on wobble or the like as a starting point, and location information recorded as a recorded pattern which merely reflects the light in varied intensities.

Since the horizontal location information is a reference information for controlling the locations of the information light and the reference light to be applied for recording, the extremely highly accuracy is required. For example, the location error of each a, b and c is preferably within 100 μm, more preferably within 10 μm, furthermore preferably within 3 μm, and the most preferably within 1 μm. The reason for the preferable range of within 100 μm is such that the control of the applying locations of the information light and the reference light is possible, if the error (dislocation) is within 100 μm. If the error is approximately 100 μm, excessively high accuracy is not required for the optical recording apparatus, and thus the production efficiency is not adversely lowered. Moreover, even if the location is dislocated, there is no problem in control, as long as the dislocated amount is known, and the control is performed based upon the dislocated amount. It is preferable that such the dislocated amount is recorded on the optical recording medium.

—Location Information Pattern—

The location information pattern is not particularly limited, and can be appropriately selected depending on the intended purpose. Examples thereof include a pattern which reflects reference light as information light.

In the case where the optical axis of the reference light is dislocated from the location information pattern at the time of reproducing the location information pattern, it is preferable that the location information pattern is recorded in a manner such that the quantity of the reflected light therefrom is reduced depending on the dislocated amount. Therefore, the dislocated amount can be detected based upon the quantity of the reflected light from the location information pattern. If the quantity of the reflected light for X-axis, and Y-axis are separately detected, the deviation can be measured by one reproducing.

—Region for Recording the Location Information Pattern—

The region for recording the location information pattern is not particularly limited, and can be appropriately selected depending on the intended purpose. Examples thereof include a recording layer, a reflection layer for the information light and the reference light, a pattern layer which is formed for the horizontal location information and has a different refractive index from that of other layers, a surface of a substrate of an optical recording medium, a pre-pit layer, a gap layer, a cover layer, and the like.

—Number of the Recorded Location Information Pattern—

The number of the recorded location information pattern is not particularly limited provided that there are at least three recorded location information patterns in the optical recording medium, and can be appropriately selected depending on the intended purpose. The number is, for example, 3-1,000, preferably 3-100, and more preferably 3-10. The aforementioned number can be set per track for tracking servo. In this case, the number is, for example, 3-1,000, preferably 3-100, and more preferably 3-10. In the case where the number of the recorded location information pattern is over 1,000, the production efficiency tends to be lowered at the time of forming the location information pattern. It is generally sufficient for detect the location information pattern, if the deposited number thereof is 1,000.

—Recording Method of the Location Information Pattern—

The recording method of the location information pattern is not particularly limited, and can be appropriately selected depending on the intended purpose. For example, in the case where the location information pattern is recorded on the recording layer, the location information pattern is recorded as a numerical date of the horizontal location or interference image of the image data by the information light and the reference light, and is then fixed. In the case where the location information pattern is recorded on the reflection layer for the information light and the reference light, the location information pattern is recorded on the surface of the reflection layer by metal deposition or the like. In the case where the location information pattern is recorded on the pattern layer, a layer having a different refractive index from that of other layers is newly formed for the location information pattern, and the location information is recorded as a variation of the reflective index. In the case where the location information pattern is recorded on the surface of the substrate, the horizontal location information is directly recorded on the surface of the substrate by a laser beam.

—Method for Detecting Horizontal Location Information—

The method for detecting the horizontal location information is not particularly limited, and can be appropriately selected depending on the intended purpose. For example, there is a method such that the information light and/or the reference light is applied to the location information pattern under the condition that the tracking servo is performed by applying the servo light, specifically under the condition that the focusing control for the location control of the thickness direction, and the tracking control for the location control of the surface direction are performed so as to match the focus point of the servo light with the track location and the address location, and to control the optical axis of the servo light to be an appropriate location, and the degree of the dislocation of the optical axis of the servo light is detected. Another example is a method wherein the tracking location is offset at a predetermined amount at the time of the tracking control, and its deviation is detected from the reflected light of the poisoning information pattern.

Note that, the information light and/or the reference light which is applied for reproducing the location information pattern may also be referred to as light for reproducing the location information pattern, hereinafter. In addition, light applied at the time of reproducing recorded information, i.e. an interference image, is merely referred as reproduction light in this description.

In the former method, if the focus point of the information light and/or the reference light (light for reproducing the location information pattern) is matched with the horizontal location information as a result of the detection, it is detected that the optical axis of the servo light and the optical axes of the information light and the reference light (light for reproducing the location information pattern) are matched to the predetermined values, and thus there is no error.

If the focus point of the information light and/or the reference light is not matched with the horizontal location information as a result of the detection, the tracking control for the horizontal location of the information light and/or reference light is performed, and the information light and the reference light are dislocated to the address location detected by the servo light so as to match the focal point thereof with the horizontal location information, and the dislocated amount is detected as a deviation $\Delta L$.

Figure 5:
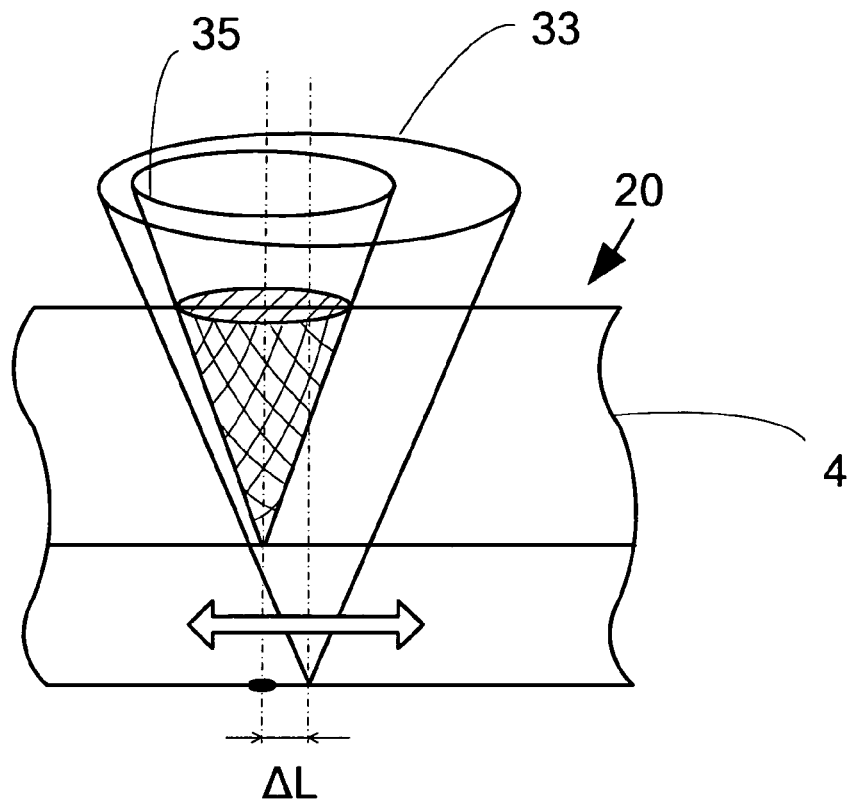
FIG. 5 is a partial perspective diagram showing a deviation $\Delta L$ between an optical axis of servo light and an optical axe(s) of information light and/or reference light (light for reproducing a location information pattern).

The method for shifting the information light and the reference light (light for reproducing the location information pattern) to match the focus point thereof is, for example, such that the information light and/or the reference light is applied to the location information pattern, the reflected light therefrom is received, the applied information and/or reference light is sifted by means of a transfer unit in the direction shown with the arrow in FIG. 5 so as to detect the location where the signal intensity of the reflected light becomes maximum, and then the optical axes of the information light and the reference light can be matched with the location of the location information pattern.

The method for detecting the maximum value of the signal intensity is not particularly limited, and can be appropriately selected depending on the intended purpose. Examples thereof include a peak hold method, and the like.

Another example of the method for sifting the information light and the reference light is such that the information light and/or the reference light is applied to the location information pattern, the reflected light therefrom is received, the applied information and/or reference light is sifted by means of a transfer unit in the direction shown with the arrow in FIG. 5 so as to detect the location where the signal error of the reflected light becomes minimum, and then the optical axes of the information light and the reference light can be matched with the location of the location information pattern.

The method for detecting the minimum value of the signal error is not particularly limited, and can be appropriately selected depending on the intended purpose. Examples thereof include a peak hold method, and the like.

The transfer unit is not particularly limited, and can be appropriately selected depending on the intended purpose. Examples thereof include a servo mechanism, and the like.

The servo mechanism is not particularly limited, and can appropriately be selected depending on the intended purpose. Examples thereof include a mechanism such that a focus error signal is generated corresponding to the deviation, the signal is transmitted and provide an instruction to a driving device via a phase compensated drive amplifier which amplifies the signal, the driving device sifts a location of an objective lens so as to control the focus point distance.

The driving device is not particularly limited, and can be appropriately selected depending on the intended purpose. Examples thereof include an actuator, a stepping motor, and the like.

—Detection of the Deviation $\Delta L$—

The detecting method of the deviation $\Delta L$ is not particularly limited, and can be appropriately selected depending on the intended purpose. For example, an address information and the horizontal location information are recorded on the optical recording medium wherein the address information is determined as a starting point, X-axis and Y-axis are taken on a surface horizontal to the recording layer, Z-axis is taken along the thickness direction of the recording layer, a location (a, b, c) which is "a" from the X-axis, "b" from the Y-axis, and "c" from the Z-axis ($a \geq 0$, $b \geq 0$, $c > 0$) is recorded on the recording layer as the horizontal location information, and the address information is recorded on the optical recording medium as a location (a, b, 0) relative to the aforementioned X-, Y-, and Z-axes. In this case, the address information is detected by the servo light, the horizontal location information is then detected by the information light and/or the reference light, and based upon the detected results, the deviation $\Delta L$ between the optical axis of the servo light and the optical axes of the information light and the reference light is measured.

The detection of the address information by using the servo light is carried out by applying the servo light to the optical recording medium, receiving the reflected light therefrom to detect the address of the exposed portion, and to detect the deviations Δa and Δb of the applied servo light from the address location (a, b, 0) relative to the X-axis and the Y-axis, respectively.

The detection of the horizontal location information by using the information light and/or the reference light is carried out by applying the information light and/or the reference light, receiving the reflected light therefrom to detect the horizontal location of the exposed portion, and to detect to the deviations Δa' and Δb' of the applied information and/or reference light from the horizontal location (a, b, c) relative to the X-axis and the Y-axis.

The deviation ΔL is expressed as Δa'−Δa with respect to the X-axis, and Δb'−Δb with respect to the Y-axis in the case where it is expressed by using the location in the coordinate.

The deviation ΔL can be expressed as a distance and an angle. In this case, the distance is expressed by the following formula, and an angle is expressed as an acute angle θ, taking either the X- or Y-axis as a base (0°).

$$\Delta L = \sqrt{(\Delta a' - \Delta a)^2 + (\Delta b' - \Delta b)^2}$$

The deviation ΔL can be expressed in a manner other than the above mentioned manner, depending on the purpose, and (Δa−Δa'), (Δb−Δb'), Δa, Δa', Δb, Δb' can be individually adjusted and applied.

The detection of the address information by using the servo light is carried out by detecting a location in the thickness direction of the optical recording medium so as to perform a focusing control, matching the focus point of the servo light with the address information, and then detecting the horizontal location. The focusing control is performed on a few regions at first, and then, if it is judged that the address information can be recognized without performing further focusing controls, it is not necessary to sequentially carry out the focusing control.

The detection of the focus location for the focusing control is not particularly limited, and can be appropriately selected depending on the intended purpose. Examples thereof include an astigmatism method, a Foucault method, and a critical angle method (refer to "Illustrative Compact Disc Handbook (Zukai Compact Disc Tokuhon)", by Hirataro Nakajima and Hiroshi Ogawa, Ohmsha Publishing, the first edition, 1986).

—Astigmatism Method—

According to the astigmatism method, a derivation between a recording location in a recording layer formed in a subjective optical recording medium, and a focus point of the information and reference light is detected. Namely, it is detected the deviation between the focal distance, i.e. a distance between the center of the objective lens and the focus point of the information and reference light, and a distance from the center of the objective lens to the recording location in the recording layer. In the astigmatism method, a beam splitter or the like is arranged in between the light source and the objective lens on a light path wherein the light is emitted from the light source, transmitted through the objective lens and applied to the optical recording medium. The reflected light is split by means of the beam splitter, and transmitted through a cylindrical lens to focus an image. In the case where the focused image is circle, it is detected that the focal distance is matched. In the case where the focused image is a vertically-long oval, it is detected that the optical recording medium is positioned too close relative to the objective lens. In the case where the focused image is horizontally-long oval, it is detected the optical recording medium is positioned to far relative to the objective lens.

The detection is performed by splitting the reflective beam into four, and comparing the shapes of the images in the diagonal regions.

—Foucault Method—

The Foucault method applies the identical process to the astigmatism method until the arrangement of the beam splitter, the collection of the reflected beam, and the transmission of the reflected beam through the cylindrical lens. In the Foucault method, a prism is arranged at a place where the reflected beam transmitted through the cylindrical lens is focused to form an image. In the case where the image is focused at the apex angle of the prism, it is detected that the focal distance is matched. In the case where the image is focused over the apex angle, it is detected that the optical recording medium is positioned too close relative to the objective lens. In the case where the image is focused before the apex angle, it is detected that the optical recording medium is positioned too far relative to the objective lens. The focusing point of the image is detected by splitting the reflected beam into two, allocating a sensor for each beam, and measuring the intensity of each beam.

—Critical Angle Method—

According to the critical angle method, detection is performed on a deviation between a recording position in a recording layer formed in the subjective optical recording medium, and the focus point of the information and reference light. Namely, it is detected the deviation between the focal distance, i.e. a distance between the center of the objective lens and the focus point of the information and reference light, and a distance from the center of the objective lens to the recording position in the recording layer. In the critical angle method, a prism is arranged in between the light source and the objective lens on the light path wherein the light is emitted from the light source, passed through the objective lens and applied to the optical recording medium. Here, the prism is disposed in a manner such that an incident angle of a ray of the center of incident light flax becomes a critical angle (an angle where the incident light is totally reflected at the surface of the prism). The focus point is detected by leading the reflected beam from the prism, and detecting the brightness of the reflected beam. In the case where the optical recording medium is positioned too close or far relative to the objective lens, the quantity of the light reflected from the prism is reduced. By using this tendency, the focus point can be detected by judging the distance (close or far) with the polarity of positive and negative (+ and −).

The detecting method of the horizontal location is not particularly limited, and can be appropriately selected depending on the intended purpose. Examples thereof include a three-beam method, a push-pull method, and a differential phase detection (DPD) method (refer to "Illustrative Compact Disc Handbook (Zukai Compact Disc Tokuhon)", by Hirataro Nakajima and Hiroshi Ogawa, Ohmsha Publishing, the first edition, 1986).

—Three-Beam Method—

The three-beam method is a method which detects a deviation of the applying location of the servo light from a track formed on the subjective optical recording medium. In the three-beam method, three beams including a substantially circular main beam, secondary beam A, and secondary beam B are used. The secondary beam A, the main beam, and the secondary beam B are equally spaced, and linearly arranged in this order. The main beam is disposed in a position where the center of the circle of the irradiated main beam is located in the middle of the width of the track. The secondary beam A is disposed in a position where the bottom of the circle of the irradiated secondary beam A contacts with the edge of the width of the track. The secondary beam B is disposed in a position where the top of the circle of the irradiated secondary beam B contacts with the edge of the width of the track.

When these beams are applied to the track in such the arrangement, a weak reflected light is reflected from the track surface, and the strong reflected light is reflected from other than the track surface. By detecting the intensity of each reflected lights, it can be detected a deviation between the irradiated positions of the three beams and the position of the track.

—Push-Pull Method—

The push-pull method is a method which detects a deviation between the position of the applied servo light and a track formed in the subjective optical recording medium. In the push-pull method, one beam is applied on the track, and the deviation is detected by a half-split beam detector. The half-split beam detector detects the reflected beam by splitting the reflected beam into two parts. In the case where the beam is applied on the center of the track width, the intensity of each light split into the left part and the right part is detected as equal. In the case where the beam is applied to either sides of the track width, the intensity of the reflected beams are detected as weak at the track surface, but detected as strong at other than the track surface. The intensity of each beam split into the left part and the right part is therefore detected as asymmetrically distributed.

—DPD Method—

The DPD (Differential phase detection) method is a method which detects a deviation between the position of applied servo light and a track formed in the subjective optical recording medium. In the DPD method, a quarter-split beam detector is used. The quarter-split beam detector is further split the beam as of the half-split beam detector used in the push-pull method. In the case where the beam is applied on the center of the track width, the intensity of the right part and the left part of the quarterly split light split into the four regions is detected as equal. In the case where the beam is applied to either sides of the track width, the intensity of the reflected beams are detected as weak at the track, but detected as strong at other than the track. The intensity of each quarterly split beam is detected as asymmetry with the left part and the right part by detecting the intensity distributions of a pair of the diagonally positioned regions within the quarterly split regions.

—Detection of a Focus Point of the Information and/or Reference Light (Light for Reproducing the Location Information Pattern)—

The detecting method of the focus point of the information light and the reference light is not particularly limited, and can be appropriately selected depending on the intended purpose. For example, by applying the information light and reference light in stead of the servo light, the three-beam method, the push-pull method, and the DPD method can be used as in the detection of the horizontal location of the servo beam.

—Radiation of the Information Light and/or Reference Light to the Location Information Pattern—

The radiation of the information light and/or the reference light to the location information pattern is not particularly limited, and can be appropriately selected depending on the intended purpose. For example, it can be utilize the same light to that for recording, or a weaker light than the light for recording. In the case where the weaker light than the light for recording is used, the exposure energy is preferably 0.1 µJ/cm² to 10,000 µJ/cm², more preferably 1 µJ/cm² to 1,000 µJ/cm², and furthermore preferably 10 µJ/cm² to 100 µJ/cm². In the case where the exposure energy is less than 0.1 µJ/cm², the detection of the focus point may not be sufficiently performed. In the case where the exposure energy is more than 10,000 µJ/cm², the interference image may be unintentionally recorded on the recording layer. The radiation of the interference light or the reference light does not cause an interference of light, and thus is suitably applied for the detection of the focus point. The radiation of both the interference light and the reference light is applied for the detection of the focus point provided that the exposure energy is weakened enough not to perform unintentional recording on the optical recording medium.

<Horizontal Location Controlling Unit>

The horizontal location controlling unit is a unit for controlling the locations of the optical axes of the information light and the reference light relative to the X-axis and the Y-axis based on the location information detected in the deviation detecting step so as to perform a recording on an appropriate location concerning the horizontal location of the information light and the reference light.

Figure 6:
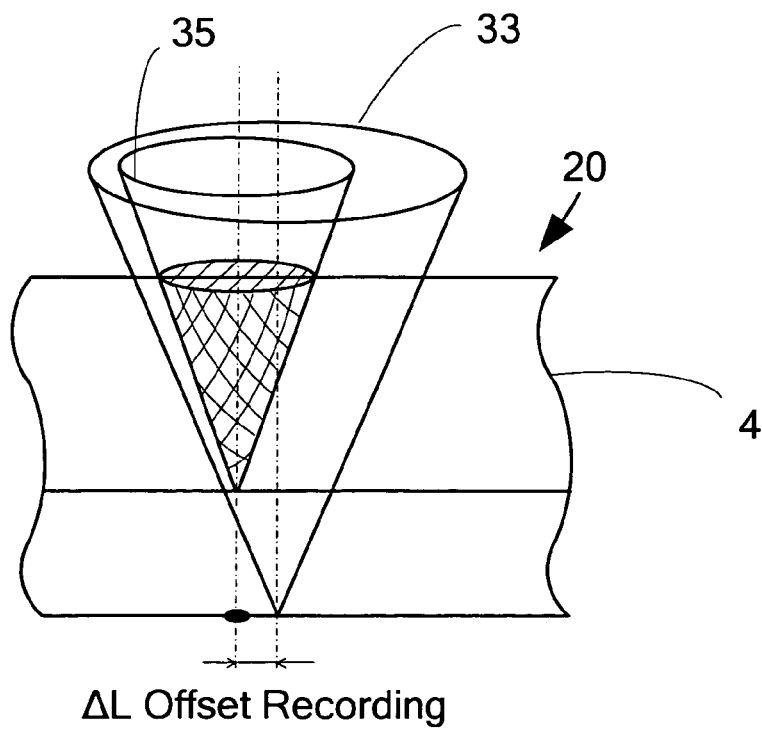
FIG. 6 is a partial perspective diagram showing a condition where information light and/or reference light (light for reproducing a location information pattern) is applied by offsetting at $\Delta L$ from servo light.

Specifically, the horizontal location controlling unit controls the locations of the optical axes of the information light and the reference light by using the deviation ΔL which is detected and calculated in the deviation detecting step. For example, as shown in FIG. 6, determined the deviation between the optical axes of the information light and the reference light and the optical axis of the servo light at ΔL is showing that the optical axes of the information light and the reference light are displaced from the optical axis of the servo light at ΔL. When the recording is performed on the predetermined optical recording medium by means of this optical recording apparatus, with shifting the deviation ΔL on any recording, the information is recorded at an appropriate location. Namely, at the time of irradiating the information light and the reference light, settling ΔL as an offset value, the information light and the reference light are shifted their locations at the offset value in advance, and then applied. Specifically, in the case where the deviation ΔL is expressed as the coordinate, the offset value is considered as Δa'−Δa for X-axis, and Δb'−Δb for Y-axis.

In the case where the deviation ΔL can be expressed as a distance and an angle, the offset volume is determined as the distance which is an amount expressed by the following formula, and an amount expressed by an acute angle θ which is obtained by taking either the X- or Y-axis as a base (0°).

$$\Delta L = \sqrt{(\Delta a' - \Delta a)^2 + (\Delta b' - \Delta b)^2}$$

In the horizontal location controlling unit, the applying location of the information light and reference light can be controlled by applying the information light and/or the reference light to the location information pattern, receiving the reflected light therefrom, and sifting the applied information light and/or the reference light in the direction shown with the arrow in FIG. 5, to thereby detect the location where the signal intensity of the reflected light becomes maximum.

The method for detecting the maximum value of the signal intensity is not particularly limited, and can be appropriately selected depending on the intended purpose. Examples thereof include a peak hold method, and the like.

The horizontal location controlling unit is not particularly limited, and can be appropriately selected depending on the intended purpose. Examples thereof include a servo mechanism, and the like.

In the horizontal location controlling unit, moreover, the applying location of the information light and the reference light can be controlled by applying the information light and/or the reference light to the location information pattern, receiving the reflected light therefrom, and sifting the applied information light and/or the reference light in the direction shown with the arrow in FIG. 5, to thereby detect the location where the signal error of the reflected light becomes minimum.

The method for detecting the minimum value of the signal error is not particularly limited, and can be appropriately selected depending on the intended purpose. Examples thereof include a peak hold method, and the like.

The horizontal location controlling unit is not particularly limited, and can be appropriately selected depending on the intended purpose. Examples thereof include a servo mechanism, and the like.

<Interference Image Recording Unit>

The interference image recording unit is a unit for applying coherent information and reference light to the recording layer for a holographic recording, forming an interference image (interference fringe) with the information light and the reference light, and recording the interference image on the recording layer.

The method of recording interference image is, for example a method wherein the brightness contrast of the interference fringe is recorded within the recording layer as variations of the reflective index. In this method, the recording layer contains a photosensitive material such as a photopolymer, and the photosensitive material induces a polymerization reaction in the bright part of the interference fringe as a result of radiation of light, and no polymerization reaction is occurred in the dark part of the interference fringe. Therefore, the bright part has higher refractive index, and the dark part has lower refractive index. In this manner, the variations of the refractive index are generated.

The radiation method of the information light and the reference light is not particularly limited, and can be appropriately selected depending on the intended purpose. For example, the reference light is applied with a certain angle with respect to the applied angle of the information light. Alternatively, the information light and the reference light are applied to the recording layer so as to the optical axes thereof are collinearly aligned.

Among them, the recording is preferably performed by applying the information light and the reference light so as to align the optical axes thereof collinearly, namely, in accordance with a collinear system, since it enables high multiplex recording, and high information transfer speed.

As a light source for the information light and the reference light, a light source which emits a coherent laser light is suitably used. Examples of such the light source include a solid laser oscillator, a semi-conductor laser oscillator, a liquid laser oscillator, a gas laser oscillator, and the like. Among them, the gas laser oscillator and the semi-conductor laser oscillator are preferable.

The laser light is not particularly limited and can be appropriately selected depending on the intended purpose. For example, the laser light is a light having a wavelength ranging from 360 nm to 850 nm. The wavelength of the laser light is preferably 360 nm to 800 nm, more preferably 400 nm to 750 nm, and the most preferably 500 nm to 600 nm since it is in the center of the visible light range, and hence is the most recognizable.

In the case where the wavelength is shorter than 360 nm, the clear interference image may not be obtained. In the case where the wavelength is over 850 nm, the interference fringe becomes very precise, and thus it may not be able to obtain the photosensitive material which corresponds to the very precise interference fringe.

The exposure energy of the laser light is not particularly limited, and can be appropriately selected depending on the intended purpose. For example, it is preferably 0.1 $\mu J/cm^2$ to 10,000 $\mu J/cm^2$, more preferably 1 $\mu J/cm^2$ to 1,000 $\mu J/cm^2$, and the most preferably 10 $\mu J/cm^2$ to 100 $\mu J/cm^2$. In the case where the exposure energy is less than 0.1 $\mu J/cm^2$, the recording may not be performed.

<Other Units>

As the other units, for example, an interference image fixing unit, or the like is available.

—Interference Image Fixing Unit—

The interference image fixing unit is a unit for applying fixing light to the interference image recorded on the recording layer by means of the interference image recording unit so as to fix the recorded interference image on the recording layer. By sufficiently applying the fixing light to the region where the interference image is recorded, the interference image is efficiently fixed, the storage stability is improved as a result of the fixing, and there can be attained an optical recording medium which does not cause an error such as noise at the time of reproducing.

—Fixing Light—

The applying area of the fixing light is appropriately selected depending on the intended purpose. For example, it is preferably the same area as the recorded area which is recorded by the information light and reference light at an arbitrary selected part in the recording layer, or preferably an area which is larger than the recorded area, and is extended from the outer boundary of the recorded area at 1 µm or less in the outer direction. If the fixing light is applied to an area which is extended from the outer boundary of the recorded area at over 1 µm, the fixing light may be also applied to the adjacent recorded area to the subjective recorded area, the exposure energy of the fixing light becomes excessive, and thus it is inefficient.

The application duration of the fixing light is not particularly limited, and can be appropriately selected depending on the intended purpose. For example, it is preferably 1 ns to 100 ms, and more preferably 1 ns to 80 ms at an arbitrary selected part in the recording layer. In the case where the application duration is shorter than 1 nm, the fixing may be insufficient. In the case where the application duration is longer than 100 ms, the applied exposure energy may become excessive. The aforementioned application of the fixing light is preferably performed within 28 hours from the recording of the interference image.

In the case where the fixing light is applied after 28 hours from the recording of the interference image, the signal quality of the recorded information may be lowered.

The applying direction of the fixing light is not particularly limited, and can be appropriately adjusted depending on the intended purpose. For example, the application direction may be the same to, or different from, the application direction of the information light and the reference light at an arbitrary selected part on the recording layer. The application angle is preferably 60° or less, and more preferably 40° or less with respect to the surface of the recording layer. In the case where the application angle is outside the aforementioned range, the fixing may be inefficient.

The wavelength of the fixing light is not particularly limited, and can be appropriately selected depending on the intended purpose. For example, the wavelength thereof is preferably 350 nm to 850 nm, and more preferably 400 nm to 600 nm. In the case where the wavelength is less than 350 nm, the material of the recording layer may be decomposed. In the case where the wavelength is more than 850 nm, the material of the recording layer may be deteriorated due to the elevation of the temperature.

The light source of the fixing light is not particularly limited, and can be appropriately selected depending on the intended purpose. For example, the light source is preferably identical to the light source of the information light and the reference light in view of that it is not necessary to newly dispose another light source only for the fixing light. The light source for the information light and the reference light is used as the light source of the fixing light by applying the emitted light from the light source to the optical recording medium. By using the same light source, the application area of the fixing light can be easily matched with the recorded area of the interference image, and thus the fixing light is efficiently applied.

The application amount of the fixing light is not particularly limited, and can be appropriately adjusted depending on the intended purpose. For example, it is preferably 0.001 mJ/cm$^2$ to 100 mJ/cm$^2$, and more preferably 0.01 mJ/cm$^2$ to 10 mJ/cm$^2$ at an arbitrary selected part in the recording layer.

The method of applying the fixing light is not particularly limited, and can be appropriately selected depending on the intended purpose. For example, it is preferably a method wherein the light emitted from the same light source to that for the information light and the reference light is applied to an arbitrary selected part in the recording layer. Alternatively, the light emitted from another light source can be applied as the fixing light.

(Optical Recording Medium)

The optical recording medium of the present invention contains a recording layer above a substrate. The recording layer is capable of recording information at least by holography, and has an interference image recorded and fixed thereon upon radiation of fixing light.

The optical recording medium of the present invention can be a relatively thin recording medium for a flat holography which records two-dimensional information, etc., or a recording medium for a volume holography which is capable of recording large volume of information such as three-dimensional images. Moreover, the optical recording medium of the present invention can be a reflective holographic recording medium, or a transmission holographic recording medium. Furthermore, examples of the holographic recording system for the optical recording medium of the present invention include a amplitude holography, a phase holography, a blazed holography, and a complex amplitude holography.

Specifically, the optical recording medium is preferably a reflective optical recording medium which is utilized for a collinear optical recording system. Such optical recording medium contains a first substrate, a recording layer, a filter layer, and a second substrate, and optionally contains other layers, if necessary.

<Recording Layer>

The recording layer contains a photosensitive material which is capable of recording information by holography. The photosensitive material is a material which changes its optical characteristics such as extinction coefficient or refractive index corresponding to a intensity of an emitted electromagnetic wave having the predetermined wavelength.

The photosensitive material for use in the recording layer is not particularly limited, and can be appropriately selected depending on the intended purpose. Examples thereof include: (1) photopolymers which are polymerized as a result of polymerization reactions induced by radiation of light; (2) photorefractive materials exhibiting a photorefractive effect (changing their refractive index as a result of a spatial charge distribution induced by radiation of light); (3) photochromic materials which change their refractive index as a result of a molecular isomerization caused by radiation of light; (4) inorganic materials such as lithium niobate, and barium titanate; (5) chalcogen materials.

The aforementioned photopolymers (1) are not particularly limited, and can be selected depending on the intended purpose. For example, the photopolymer contains a monomer, and a photoreaction initiator, and optionally contains other components such as a sensitizer, oligomer, and the like, if necessary.

As the photopolymer, those described in the following publications can be used: "Photopolymer Handbook" (Kogyo Chosakai publishing., 1989); "Photopolymer Technology" (THE NIKKAN KOGYO SHIMBUN LTD., 1989); SPIE Journals and Proceedings Vol. 3010, p. 354-p. 372 (1997); SPIE Journals and Proceedings Vol. 3291, p. 89-p. 103 (1998). In addition, those described in the following patent publications are also used as the photopolymer: U.S. Pat. Nos. 5,759,721, 4,942,112, 4,959,284, and 6,221,536; International Patent Application Publication Nos. WO/97/44714, 97/13183, and 99/26112; Japanese Patent Application Publication (JP-B) Nos. 2880342, 2873126, 2849021, 3057082, and 3161230; JP-A Nos. 2001-316416, and 2000-275859.

As the method for irradiating the photopolymer with a light so as to change its optical characteristics, a method utilizing a dispersion of low molecular substances is applicable. In this method, a substance which disperses to the direction opposite to the polymerizing direction of the polymerizable substance is added. Alternatively, a compound having an acid cleavage structure is optionally added to the photopolymer.

In the case that the recording layer is formed by using a photopolymer containing the low molecular substance, it is necessary that the recording layer has a structure which is able to hold a liquid therein. In the case where the compound having an acid cleavage structure is added, the volume change can be controlled by compensating the expansion caused by the cleavage with the shrinkage caused by the polymerization of the monomer, or vise versa.

The monomer is not particularly limited, and can be appropriately selected depending on the intended purpose. Examples thereof include a radical polymerizable monomer having an unsaturated bond such as acrylic group or methacrylic group, a cationic polymerizable monomer having an ether structure such as epoxy ring or oxetane ring, and the like. These monomers may have mono- or multi-valency. These monomer may also be photo-crosslinkable.

Examples of the radical polymerizable monomer include acryloylmorpholine, phenoxyethylacrylate, isobomylacrylate, 2-hydroxypropylacrylate, 2-ethylhexylacrylate, 1,6-hexanedioldiacrylate, tripropyleneglycoldiacrylate, neopentylglycol PO-modified diacrylate, 1,9-nonandioldiacrylate, hydroxyl-pivalic acid neopentylglycoldiacrylate, EO-modified bisphenol A diacrylate, polyethleneglycoldiacrylate, pentaerythritoltriacrylate, pentaerythritoltetraacrylate, pentaerythritolhexaacrylate, EO-modified glyceloltriacrylate, trimethylolpropanetriacrylate, EO-modified trimethylolpropanetriacrylate, 2-naphtho-1-oxyethylacrylate, 2-cabazoil-9-yl-ethylacrylate, (trimethylsilyloxy)-dimethylsilylpropylacrylate, and vinyl-1-naphthoate, N-vinylcarbazol.

Examples of the cationic polymerizable monomer include bisphenol A epoxy resins, phenol novolac epoxy resins, glyceloltriglycidylether, 1,6-hexaneglycidylether, vinyltrimethoxysilane, 4-vinylphenyl-trimethoxysilane, γ-methacryloxypropyl-triethoxysilane, and compounds expressed by the following structural formulas A to E:

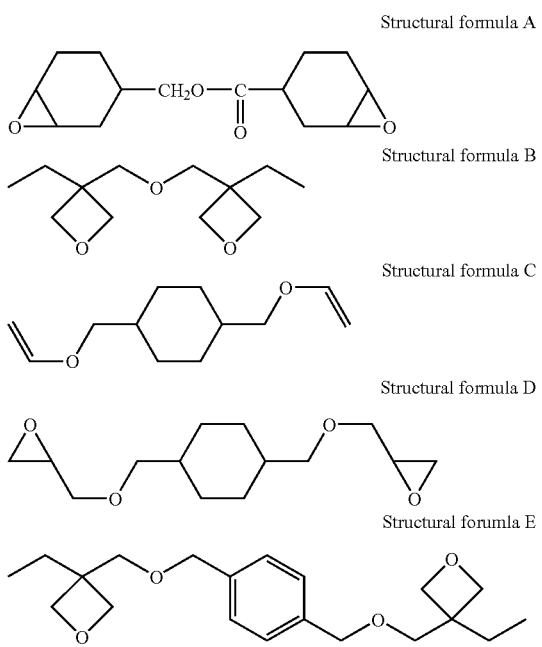

Structural formula A

Structural formula B

Structural formula C

Structural formula D

Structural forumla E

These monomers can be used singly or in combination of two or more.

The photopolymerization initiator is not particularly limited, and can be appropriately limited depending on the intended purpose. The photopolymerization initiator is materials which induces radical polymerization, cationic polymerization, crosslinking reaction, or the like upon radiation of light.

Examples of the photopolymerization initiator include 2,2-bis(o-chlorophenyl)-4,4',5,5'-tetraphenyl-1,1'-biimidazole, 2,4,6-tris(trichloromethyl)-1,3,5-triazine, 2,4-bis(trichloromethyl)-6-(p-methoxyphenylvinyl)-1,3,5-triazine, diphenyliodoniumtetrafluoroborate, diphenyliodoniumhexafluorophosphate, 4,4'-di-t-butyldiphenyliodoniumtetrafluoroborate, 4-diethylaminophenylbenzeneazoniumhexafluorophosphate, benzoin, 2-hydroxy-2-methyl-1-phenylpropane-2-one, benzophenon, thioxanthone, 2,4,6-trimethylbenzoyldiphenylacylphosphineoxide, triphenylbutylboratetetraethylammonium, and a titanothene compound expressed by the following structural formula:

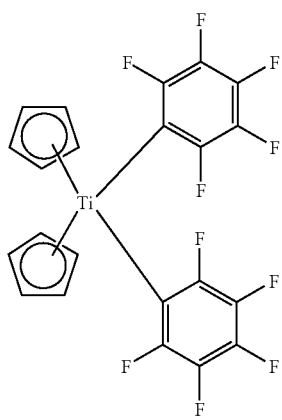

These may be used singly or in combination of two or more. Moreover, the photopolymerization initiator can be used together with a sensitizing dye corresponding to the irradiating light.

The photopolymer is obtained by mixing and stirring the monomer, the photopolymerization initiator, and other components, if necessary, and then reacting the mixture. If the thus obtained photopolymer has a sufficiently low viscosity, a recording layer can be formed by casting the photopolymer. If the photopolymer has too high viscosity to cast, the photopolymer is applied on a second substrate by means of a dispenser, and is pressed and spread with an another substrate, which is used as a lid, onto the surface of the second substrate so as to form a recording layer.

The photorefractive material (2) is not particularly limited, and can be appropriately selected depending on the intended purpose. For example, the photorefractive material contains a charge-generating material, and a charge-transporting material, and optionally contains other components, if necessary.

The charge-generating material is not particularly limited, and can be appropriately selected depending on the intended purpose. Examples thereof include: phthalocyanine dyes or pigments such as metallo-phthalocyanines, metal-free phthalocyanines, and derivatives thereof; naphthalocyanine dyes or pigments; azo dyes or pigments such as mono-azoic compounds, dis-azoic compounds, and tris-azo compounds; pelylene dyes or pigments; indigo dyes or pigments; quinacridone dyes or pigments; polycyclic quinine dyes or pigments such as anthraquinone, anthanthrone, and cyanine; electric charge transferring complexes composed of electric charge donors and electric charge acceptors, represented as TTF-TCNQ; azulenium salts; fullerenes represented as C50 and C70, and derivatives thereof such as metha-fullerene. They may be used singly or in combination of two or more.

The charge-transporting material is a material which transports holes or electrons, and is either a low-molecular compound or a high-molecular compound.

The charge-transporting material is not particularly limited, and can be appropriately selected depending on the intended purpose. Examples thereof include: nitrogen-including cyclic compounds and derivatives thereof, such as indole, carbazole, oxazole, inoxazole, thiazole, imidazole, pyrazole, oxadiazole, pyrazoline, thiadiazole and triazole; hydrazoline compounds; triphenyl amines; triphenylmethanes; butadienes; stilbenes; quinone compounds and derivatives thereof, such as anthraquinon diphenoquinon; fullerenes and derivatives thereof, such as C60 and C70; π conjugated polymers and oligomers, such as polyacetylene, polypyrrole, polythiophene and polyaniline; σ conjugated polymers and oligomers, such as polysilane and polygermane; and polycyclic aromatic compounds, such as anthracene, pyrene, phenanthrene, and coronene. They may be used singly or in combination of two or more.

As a method for forming a recording layer with the photorefractive material, for example, there is a method wherein the photorefractive material is dissolved and/or dispersed in a solvent to obtain a coating solution, the coating solution is applied to form a coated film, and the solvent is removed from the coated film so as to form a recording layer. There is also a method wherein the photorefractive material is heated so as to fluidize, the fluidized material is coated so as to form a coated film, and the coated film is quenched so as to form a recording layer.

The photochromic material (3) is not particularly limited provided that the material causes a photochromic reaction, and can be appropriately selected depending on the intended purpose. Examples thereof include azobenzenes, stilbenes, indigos, thioindigos, spiropyrans, spirooxazines, fulgides, anthracenes, hydrazones, and cinnamic acids. Amongst of them, the azobenzene derivatives and stilbene derivatives which cause cis-trans isomerization upon radiation of light, and spiropyran derivatives and spirooxazine derivatives which cause ring-opening and closing structural change upon radiation of light.

The chalcogen compound (5) is, for example, a material which contains chalcogenide glass containing chalcogen elements, and metal particles dispersed in the chalcogenide glass wherein the metal particles are formed of a metal which is capable of being diffused in the chalcogenide glass upon radiation of light.

The chalcogenide glass is not particularly limited, provided that it is formed of a non-oxide amorphous material containing chalcogen elements such as S, Te, or Se, and is capable of optical doping of metal particles.

The amorphous material containing the chalcogen elements is preferably a Ge—S glass, an As—S glass, an As—Se glass, an As—Se—Ce glass, or the like. Among them, the Ge—S glass is the most preferable. In the case where the Ge—S glass is used as the calcogenide glass, a ratio of Ge to S is arbitrarily selected depending on a wavelength of the irradiating light, but the preferred is the chalcogenide glass mainly having a chemical formula expressed by $GeS_2$.

The metal particles are not particularly limited provided that they photodope in the chalcogenide glass upon radiation of light, and can be appropriately selected depending on the intended purpose. Examples thereof include Al, Au, Cu, Cr, Ni, Pt, Sn, In, Pd, Ti, Fe, Ta, W, Zn, Ag, and the like. Among them, Ag, Au and Cu are preferable as they easily generate photodoping, and Ag is preferable as it remarkably generates photodoping.

The content of the metal particles dispersed in the chalcogenide glass is preferably 0.1% by volume to 2% by volume, and more preferably 0.1% by volume to 1% by volume with respect to the total volume of the recording layer. In the case where the content of the metal particles is less than 0.1% by volume, the change of transmittance due to photodoping becomes insufficient, and thus the recording quality decreases. In the case where the content of the metal particles is more than 2% by volume, the transmittance of the material forming the recording layer becomes lower, and thus it is difficult to sufficiently generate photodoping.

The forming method of the recording layer can be selected from the conventional method depending on the material which forms the recording layer. Examples thereof include a vapor deposition method, a wet coating method, a MBE (molecular beam epitaxy) method, a cluster ion beam method, a molecular laminate method, a LB method, a printing method, and a transcription method. Amongst of them, the vapor deposition method and the wet coating method are preferred.

The vapor deposition method is not particularly limited, and can be appropriately selected from the conventional methods depending on the intended purpose. Examples thereof include a vacuum vapor deposition method, a resistance heating deposition method, a chemical vapor deposition (CVD) method, and a physical vapor deposition method. Examples of the chemical vapor deposition method include a plasma CVD method, a laser CVD method, a heat CVD method, and a gas source CVD method.

The wet coating method is suitably performed by using (coating and drying) a solution, i.e., coating solution, which contains the material for the recording layer dissolved and/or dispersed therein. The wet coating method is not particularly limited, and can be selected from the conventional methods depending on the indented purpose. Examples thereof include an ink-jet method, a spin-coating method, a kneader-coating method, a bar-coating method, a blade-coating method, a casting method, a dip-coating method, and a curtain-coating method.

The thickness of the recording layer is not particularly limited, and can be selected depending on the intended purpose. The thickness thereof is preferably 1 µm to 1,000 µm, and more preferably 100 µm to 700 µm.

If the thickness of the recording layer is within the aforementioned preferable range, the sufficient S/N ratio can be attained on the shift multiplex of 10 to 300. If the thickness is within the aforementioned more preferred range, such the technical effect becomes significant.

—Filter Layer—

The filter layer is a layer which selectively reflects light, namely transmitting one light (a first light), and reflecting another light (a second light) which is different from the one light (the first light). The filter layer is, for example, an inorganic filter layer which contains a colored material-containing layer, and a dielectric material deposited layer, or an organic filter layer which contains a cholesteric liquid crystal layer.

—Colored Material-Containing Layer—

The colored material-containing layer contains a colored material, a binder resin, and a solvent, and optionally contains other components, if necessary.

The colored material contains at least one of pigments and dyes. Among them, red dyes and red pigments are preferable since they absorb the light having a wavelength of 532 nm, but transmitting servo light having a wavelength of 655 nm. Moreover, the red pigments are more preferable.

The red dyes are not particularly limited, and can be selected from the known products depending on the intended purpose. Examples thereof include: acid dyes such as C.I. Acid Reds 1, 8, 13, 14, 18, 26, 27, 35, 37, 42, 52, 82, 87, 89, 92, 97, 106, 111, 114, 115, 134, 186, 249, 254 and 289; basic dyes such as C.I. Basic Reds 2, 12, 13, 14, 15, 18, 22, 23, 24, 27, 29, 35, 36, 38, 39, 46, 49, 51, 52, 54, 59, 68, 69, 70, 73, 78, 82, 102, 104, 109 and 112; and reactive dyes such as C.I. Reactive Reds 1, 14, 17, 25, 26, 32, 37, 44, 46, 55, 60, 66, 74, 79, 96 and 97. They may be used singly or in combination of two or more.

The red pigments are not particularly limited, and can be appropriately selected from the known products depending on the intended purpose. Examples thereof include C.I. Pigment Reds 9, 97, 122, 123, 149, 168, 177, 180, 192, 209, 215, 216, 217, 220, 223, 224, 226, 227, 228, 240, C.I. Pigment Red 48:1, Permanent Carmine FBB (C.I. Pigment Red 146), Permanent Ruby FBH (C.I. Pigment Red 11) and Faster Pink B Supra (C.I. Pigment Red 81). They may be used singly or in combination of two or more.

Among them, the specially preferable colored material is a red pigment which shows a transmittance spectrum such that a transmittance of the light having a wavelength of 532 nm is 10% or less and a transmittance of the light having a wavelength of 655 nm is 90% or more.

The content of the colored material is preferably 0.05% by mass to 90% by mass, and more preferably 0.1% by mass to 70% by mass with respect to the total solids content of the colored material-containing layer. In the case where the content is less than 5% by mass, the thickness of the colored material-containing layer needs to be 500 µm or more. In the case where the content is more than 90% by mass, the colored material-containing layer cannot self-supported, and thus the layer may be broken down during the process of forming a colored material-containing layer.

—Binder Resin—

The binder resin is not particularly limited, and can be appropriately selected from the known binders depending on the intended purpose. Examples thereof include polyvinyl alcohol, vinyl chloride-vinyl acetate copolymer, a copolymer of vinyl acetate and at least one selected from vinyl alcohol, maleic acid, and acrylic acid, vinyl chloride-vinyliden chloride copolymer, vinyl chloride-acrylonitrile copolymer, ethylene-vinyl acetate copolymer, a cellulose derivative such as a nitrilocellulose resin, a polyacrylic resin, polyvinyl acetal, polyvinyl butyral, an epoxy resin, a phenoxy resin, polyurethane, polycarbonate and the like. They may be used singly or in combination of two or more.

One or more polar groups are preferably introduced into the aforementioned binder resins so as to further improve dispersibility and durability thereof. The polar group is at least one selected from the group consisting of epoxy groups, $CO_2H$, $OH$, $NH_2$, $SO_3M$, $OSO_3M$, $PO_3M_2$, $OPO_3M_2$. Note that M denotes a hydrogen atom, alkali metal or ammonium, and when more than one M is present in one polar group, those may be identical to or deferent from each other. The content of the polar group is preferably $10^{-6}$ to $10^{-4}$ equivalent with respect to one gram of the binder resin.

The binder resin is preferably subjected to a curing treatment by an addition of the conventional crosslinking agent such as an isocyanate crosslinking agent.

The content of the binder resin is preferably 10% by mass to 99.95% by mass, and more preferably 30% by mass to 99.9% by mass with respect to the total solids content of the colored material-containing layer.

The aforementioned components are dissolved and/or dispersed in a suitable solvent to prepare a coating solution, and the coating solution is applied onto a substrate, which will be described later, in accordance with an arbitrarily selected coating method to thereby form a colored material-containing layer.

The solvent is not particularly limited, and can be appropriately selected from the conventional solvents depending on the intended purpose. Examples thereof include: water; alkoxypropionic acid esters such as methyl-3-methoxypropionate, ethyl-3-methoxypropionate, propyl-3-methoxypropionate, methyl-3-ethoxypropionate, ethyl-3-ethoxypropionate, and propyl-3-ethoxypropionate; alkoxy alcohol esters such as 2-methoxypropylacetate, 2-ethoxypropylacetate, and 3-methoxybutylacetate; lactic acid esters such as methyl lactate and ethyl lactate; ketones such as methyl ethyl ketone, cyclohexanone, and methylcyclohexanone; γ-butyrolactone; N-methylpyrrolidone; dimethylsulfoxide; chloroform; and tetrahydrofuran. They may be used singly or in combination of two or more.

The coating method is not particularly limited, and can be appropriately selected depending on the intended purpose. Examples thereof include an ink-jet method, a spin-coating method, a kneader-coating method, a bar-coating method, a blade-coating method, a casting method, a dip-coating method, a curtain-coating method, and the like.

The thickness of the colored material-containing layer is preferably 0.5 μm to 200 μm, and more preferably 1 μm to 100 μm. If the thickness is less than 0.5 μm, the addition amount of the binder resin may not be enough to coat the colored material and to form a film. If the thickness is more than 200 μm, the thickness of the filter becomes too thick, and thus an excessively large optical system for irradiating light and servo light is required.

—Dielectric Material-Deposited Layer—

The dielectric material-deposited layer is formed on the colored material-containing layer, and is a laminate of two or more dielectric films each having mutually different refractive index. In order to make the filter layer selectively reflective, the dielectric material-deposited layer is preferably a laminate of two or more layer wherein a dielectric film having a high refractive index, and a dielectric film having a low refractive index are alternately disposed. In this case, two deferent dielectric films may be laminated, or more than two deferent dielectric films may be laminated.

A number of the films to be laminated is preferably 2-20, more preferably 2-12, further more preferably 4-10, and especially preferably 6-8. In the case where the number of the films is more than 20, the production efficiency is lowered as a large number of films needs to be deposited, and thus the objects and effects of the present invention may not be achieved.

The lamination order of the dielectric films is not particularly limited, and can be appropriately selected depending on the intended purpose.

For example, a dielectric film of a lower refractive index is deposited first in a case where the adjacent dielectric film has a high refractive index. On the other hand, a dielectric film with a higher refractive index is deposited first in a case where the adjacent dielectric film has a low refractive index. The criteria of refractive index for determining whether a dielectric thin layer has high or low refractive index is preferably set to 1.8. Note, however, that this determination is made on an arbitrary basis. That is, dielectric thin layers with different refractive indices equal to or greater than 1.8 (i.e., there are dielectric thin layers with high and low refractive indices) may be used to form such a laminate.

The material for the dielectric film of a high refractive index is, for example, $Sb_2O_3$, $Sb_2S_3$, $Bi_2O_3$, $CeO_2$, $CeF_3$, $HfO_2$, $La_2O_3$, $Nd_2O_3$, $Pr_6O_{11}$, $Sc_2O_3$, $SiO$, $Ta_2O_5$, $TiO_2$, $TlCl$, $Y_2O_3$, $ZnSe$, $ZnS$, $ZrO_2$, or the like. Among the above-listed materials, $Bi_2O_3$, $CeO_2$, $CeF_3$, $HfO_2$, $SiO$, $Ta_2O_5$, $TiO_2$, $Y_2O_3$, $ZnSe$, $ZnS$, and $ZrO_2$ are preferable, and $SiO$, $Ta_2O_5$, $TiO_2$, $Y_2O_3$, $ZnSe$, $ZnS$, and $ZrO_2$, are specially preferable.

The material for the dielectric film of a low refractive index is, for example, $Al_2O_3$, $BiF_3$, $CaF_2$, $LaF_3$, $PbCl_2$, $PbF_2$, $LiF$, $MgF_2$, $MgO$, $NdF_3$, $SiO_2$, $Si_2O_3$, $NaF$, $ThO_2$, $ThF_4$, or the like. Among the above-listed materials, $Al_2O_3$, $BiF_3$, $CaF_2$, $MgF_2$, $MgO$, $SiO_2$, and $Si_2O_3$ are preferable, and $Al_2O_3$, $CaF_2$, $MgF_2$, $MgO$, $SiO_2$, and $Si_2O_3$ are specially preferable.

The atomic ratio of the material for the dielectric film is not particularly limited, and can be appropriately selected depending on the intended purpose. The atomic ratio is adjusted, for example, by changing the density of the atmospheric gas at the time of forming the film.

The forming method of the dielectric film is not particularly limited, and can be appropriately selected depending on the intended purpose. Examples thereof include: vacuum vapor deposition methods such as an ion-plating method, and an ionic-beam method; physical vapor deposition (PVD) methods such as a sputtering method; and chemical vapor deposition (CVD) methods. Among them, the vacuum vapor deposition method and the sputtering method are preferable, and the sputtering method is the most preferable.

The sputtering method is preferably a DC sputtering method which has a high rate of film formation. In the DC sputtering method, it is preferred that a material of high conductivity is used.

A method for forming a multi-layered film in accordance with the sputtering is, for example, (1) a one-chamber method wherein a film formation is performed by using a plurality of targets alternately or sequentially within one chamber, or (2) a multi-chamber method wherein a film formation is performed continuously in a plurality of chambers. The multi-camber method is specially preferred in view of the production efficiency and prevention of the material contamination.

The thickness of the dielectric film is preferably $\lambda/16$ to $\lambda$, more preferably $\lambda/8$ to $3\lambda/4$, and further more preferably $\lambda/6$ to $3\lambda/8$ of optical wavelength order.

In the dielectric material-deposited layer, a part of the light propagating through the dielectric material-deposited layer is multiply reflected by each of the dielectric films, the reflected beams of light are interfered each other, and light only at certain wavelength is selectively transmitted. Such the wavelength is determined by the multiplication of the thickness of the dielectric film and its refractive index. The center transmission wavelength of the dielectric material-deposited layer has an angle dependency to incident light, and thus the transmission wavelength can be changed by varying an incident angle of the light.

Note that, since the number of the laminated layers of the dielectric material-deposited layer is 20 or less, a few to several tens percents of the selective reflection wavelength light is leaked and transmitted through the filter, but the leaked light is absorbed by the colored material-containing layer disposed just under the dielectric material-deposited layer. As the colored material-containing layer contains red pigments or red dyes, the colored material-containing layer absorbs a first light having a wavelength of 600 nm to 900 nm, but transmits the light having a wavelength of 350 nm to 600 nm, which is used for servo light.

The filter layer containing the colored material-containing layer and the dielectric material-deposited layer is preferably configured to transmit the first light having a certain wavelength, and to reflect the second light having another wavelength. The aforementioned wavelength of the first light is preferably 600 nm to 900 nm, and aforementioned wavelength of the second light is preferably 350 nm to 600 nm. To achieve this function, the optical recording medium has a structure such that the recording layer, the dielectric material-deposited layer, the colored material-containing layer, and the servo-pit pattern are disposed in this order from the side where an optical system is arranged.

The thickness of the inorganic filter layer is preferably 0.1 µm to 20 µm, and more preferably 0.3 µm to 10 µm.

—Cholesteric Liquid Crystal Layer—

The cholesteric liquid crystal layer contains at least one of a nematic liquid crystal compound, and a chiral compound, and optionally contains a polymerizable monomer and other components, if necessary.

The cholesteric liquid crystal layer is a single layer, or a laminate of two or more layers. The cholesteric liquid crystal layer is preferably a laminate of two to ten layers. If the number of layers to be laminated is more than 10, the production efficiency is lowered in terms of coatings, and thus the objects and effects of the present invention may not be achieved.

The cholesteric liquid crystal layer is preferably a layer which has a property to selectively separate a certain circularly polarized light from a light flax. The cholesteric liquid crystal layer having such property reflects the only circularly polarized light which has the same direction of the circular polarization to the spiral direction (clockwise or anti-clockwise) of the liquid crystal, and has the wavelength corresponding to the spiral pitch of the liquid crystal. By utilizing this selective reflection property of the cholesteric liquid crystal layer, the cholesteric crystal liquid layer selectively transmit the certain circularly polarized light from the natural light of a certain wavelength range, and reflects the rest of the light.

Accordingly, the cholesteric liquid crystal layer is preferably configured to transmit a light having a certain wavelength, and to reflect a circularly polarized light having another wavelength. The aforementioned wavelength of the first light is preferably 600 nm to 900 nm, and the aforementioned wavelength of the second light is 350 nm to 600 nm.

The selective reflection property of the cholesteric liquid crystal layer is effective to a certain range of the wavelength, and it is difficult to cover the whole range of the visible light. Namely, the selective reflection wavelength range $\Delta\lambda$ of the cholesteric liquid crystal layer is expressed by the following equation 1:

$$\Delta\lambda = 2\lambda(ne-no)/(ne+no) \qquad \text{Equation 1}$$

In the equation 1, "no" denotes a reflectance of the nematic liquid crystal molecular contained in the cholesteric liquid crystal layer with respect to an ordinary light, "ne" denotes a reflectance of the nematic liquid crystal molecular with respect to an extraordinary light, and "$\lambda$" denotes a center wavelength of the selective reflectance.

As shown with the equation 1, the selective reflection wavelength range $\Delta\lambda$ depends on the molecular structure of the nematic liquid crystal. According to the equation 1, the selective reflection wavelength range $\Delta\lambda$ can be widen by increasing the value of (ne−no). However, (ne−no) is generally 0.3 or less, and when it is more than 0.3, the functions as a liquid crystal, such as orientation abilities, liquid crystal phase transition temperature, and the like becomes insufficient, and thus it is not suitable for a practical use. Therefore, the selective reflection wavelength range $\Delta\lambda$ of the cholesteric liquid crystal layer is approximately 150 nm at maximum, and is preferably 30 nm to 100 nm.

The center wavelength $\lambda$ of the selective reflectance is expressed by the following equation 2:

$$\lambda = (ne+no)P/2 \qquad \text{Equation 2}$$

In the equation 2, "ne" and "no" denote the same as in the equation 1, and P denotes a spiral pitch length required for one spiral twist in the cholesteric liquid crystal layer.

As shown with the equation 2, the center wavelength $\lambda$ of the selective reflectance depends on the birefringence magnitude $\Delta n$ and average spiral pitch P of the cholesteric liquid crystal layer provided that the average spiral pitch P is constant. In order to widen the selective reflection wavelength range, it is therefore preferable that the center wavelengths $\lambda$ of each laminated layers of the cholesteric liquid crystal layer are mutually different, and the spiral directions (clockwise or anti-clockwise) of the laminated layers are identical.

The selective reflection wavelength ranges of the laminated layers are preferably continuous in order to attain a uniform reflectance within these ranges. Note that "continuous" means that there is no gap between the selective reflection wavelength ranges, and the reflectance within these ranges is substantially 40% or more.

Therefore, the distance between the center wavelengths $\lambda$ of the laminated layers are within such a range that the selective reflection wavelength ranges thereof become continuous.

The cholesteric liquid crystal layer is a laminate of a base and a cholesteric liquid crystal layer to form a filter for the optical recording medium, or a laminate of a substrate and the filter for the optical recording medium. The cholesteric liquid crystal layer may be directly disposed on the aforementioned substrate.

<Filter for Optical Recording Medium>

The filter for the optical recording medium is a laminate of a base and single or multi layered cholesteric liquid crystal layer disposed on the base. The optical characteristics of the filter can be appropriately selected depending on the intended purpose. For example, the reflectance is preferably 40% or more with respect to $\lambda_0 - \lambda_0/\cos 20°$ which is a range of $\pm 20°$ when the incident angel is set as $0°$, and is more preferably 40% or more with respect to $\lambda_0 - \lambda_0/\cos 40°$ which is a range of $\pm 40°$ when the incident angel is set as $0°$. Note that $\lambda_0$ denotes a wavelength of the irradiating light.

If the reflectance is 40% or more at $\lambda_0 - \lambda_0/\cos 20°$, preferably at $\lambda_0 - \lambda_0/\cos 40°$, the angle dependency of the irradiating light can be reduced, and thus any optical system which is generally used for the conventional optical recording medium can be utilized.

Figure 8:
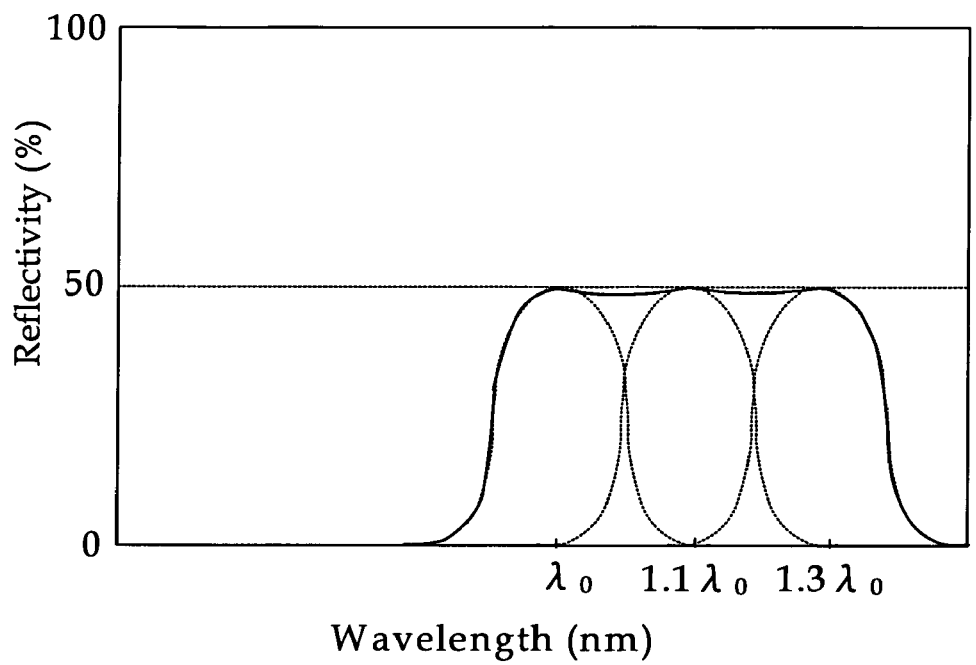
FIG. 8 is a graph showing a reflectance of a laminate of three cholesteric liquid crystal layers.
Figure 9:
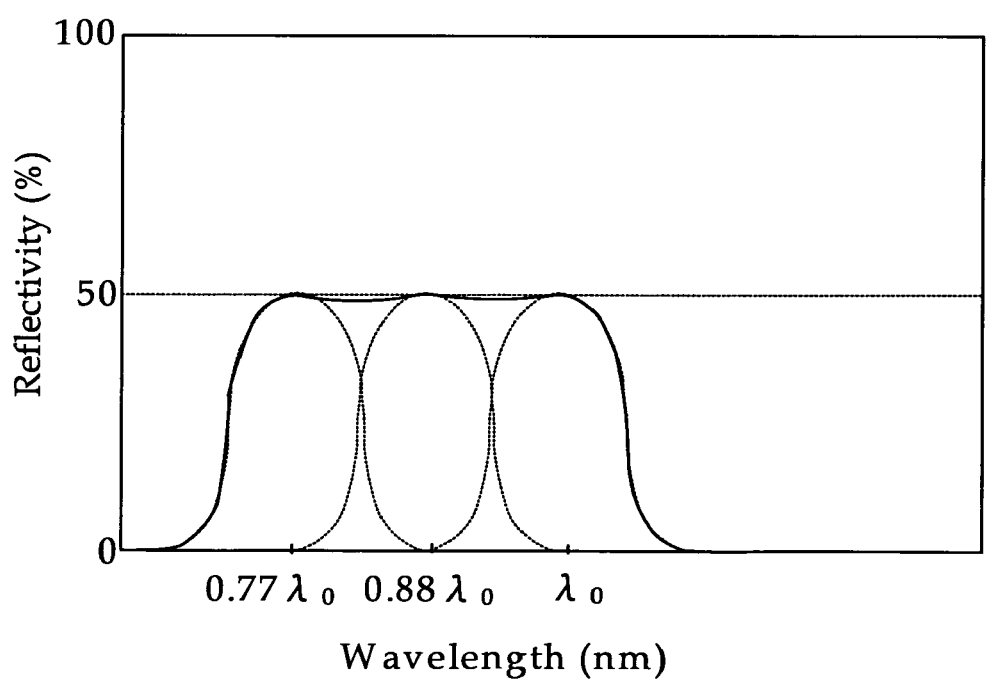
FIG. 9 is a graph showing a reflectance of a laminate of three cholesteric liquid crystal layers.

Specifically, if three cholesteric liquid crystal layers having mutually different center wavelengths of selective reflection and identical spiral rotations are laminated, a filter for an optical recording medium exhibiting reflectance as shown in FIG. 8 can be obtained. FIG. 8 shows that the reflectance is 40% or more with respect to the irradiating light from normal direction ($0°$). If the incident light is irradiated with an angle, the selective reflection wavelength range is sifted to the shorter wavelength side. When the incident light is inclined at $40°$ in the cholesteric liquid crystal layer, the filter has a reflectance as shown in FIG. 9.

Figure 10:
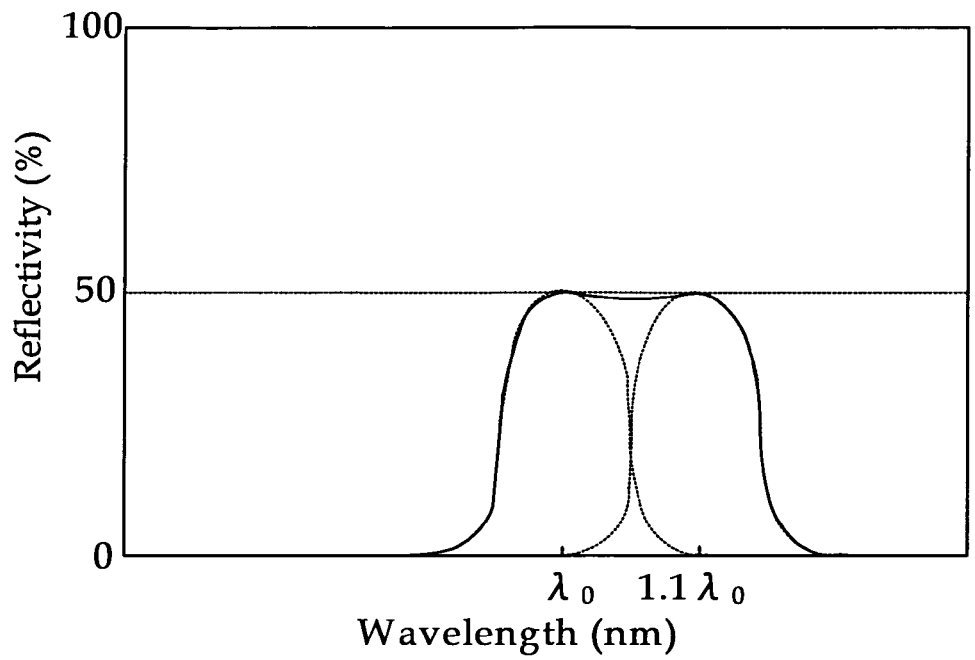
FIG. 10 is a graph showing a reflectance of a laminate of two cholesteric liquid crystal layers.
Figure 11:
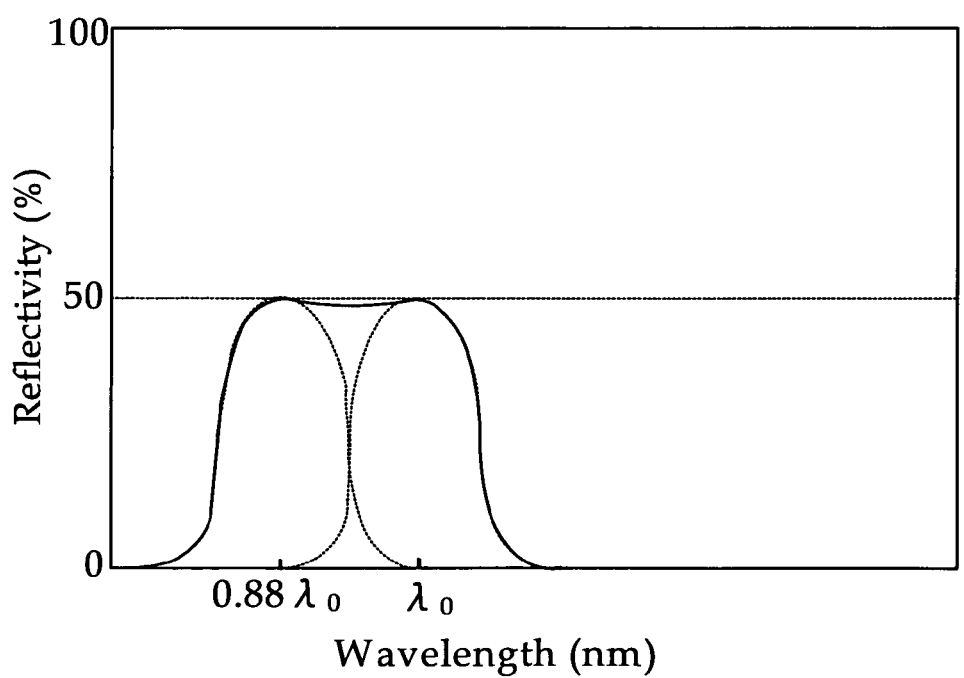
FIG. 11 is a graph showing a reflectance of a laminate of two cholesteric liquid crystal layers.

Similarly, if two cholesteric liquid crystal layers having mutually different center wavelengths of selective reflection and identical spiral rotations are laminated, a filter for an optical recording medium exhibiting reflectance as shown in FIG. 10 can be obtained. FIG. 10 shows that the reflectance is 40% or more with respect to the irradiating light from normal direction ($0°$). If the incident light is irradiated with an angle, the selective reflection wavelength range is sifted to the shorter wavelength side. When the incident light is inclined at $20°$ in the cholesteric liquid crystal layer, the filter has a reflectance as shown in FIG. 11.

With respect to the reflection range of from $\lambda_0$ to $1.3 \lambda_0$ shown in FIG. 8, $1.3 \lambda_0$ is 692 nm when $\lambda_0$ is 532 nm, and thus the servo light is reflected if the servo light has a wavelength of 655 nm. The range of $\lambda_0$ to $1.3 \lambda_0$ is applicability for the incident light having an incident angle of $\pm 40°$ with respect to the filter for an optical recording medium. In the case where the incident light has such a large incident angle, the servo control is suitably performed without causing any problem, provided that the servo light having an incident angle of $\pm 20°$ is masked. If each cholesteric liquid crystal layers for used in the filter layer is designed to have a large reflective index, the incident angle within the filter for an optical recording medium can be easily designed to be within $\pm 20°$. In such a case, the filter layer can be composed by laminating two layers of the cholesteric liquid crystal layer of $\lambda_0$ to $1.1 \lambda_0$ shown in FIG. 10, and thus there is no problem in transmitting the servo light.

From the results shown in FIGS. 8-11, the filter for an optical recording medium maintains a refractive index of 40% or more with respect to an incident light having an incident angle of $0°$-$20°$, preferably $0°$-$40°$. Accordingly, the filter for an optical recording medium has no problem in recording a signal.

Each of the cholesteric liquid crystal layers to be laminated is not particularly limited provided that the aforementioned characteristics are attained, and can be appropriately selected depending on the intended purpose. Each cholesteric liquid crystal layer contains a nematic liquid crystal compound and a chiral compound, and optionally contains a polymerizable monomer and other components, if necessary.

The number of cholesteric liquid crystal layers to be laminated is preferably two or more, and more preferably four to ten. In the case where the number of the laminated layers is less than 4, the selective reflection wavelength is sifted to a shorter wavelength side as an incident angle increases, and thus the selective reflection of the predetermined wavelength may not be carried out. In the case where the number of the laminated layer is more than 10, the production efficiency is lowered in terms of the coating, and thus the objects and effects of the present invention may not be achieved.

The cholesteric liquid crystal layer is preferably a layer which has a property to selectively separate a certain circularly polarized light from a light flux. The cholesteric liquid crystal layer having such property reflects the only circularly polarized light which has the same direction of the circular polarization to the spiral direction (clockwise or anti-clockwise) of the liquid crystal, and has the wavelength corresponding to the spiral pitch of the liquid crystal. By utilizing this selective reflection property of the cholesteric liquid crystal layer, the cholesteric crystal liquid layer selectively transmit the certain circularly polarized light from the natural light of a certain wavelength range, and reflects the rest of the light.

Accordingly, the cholesteric liquid crystal layer is preferably configured to transmit a light having a certain wavelength, and to reflect a circularly polarized light having another wavelength. The aforementioned wavelength of the first light is preferably 600 nm to 900 nm, and the aforementioned wavelength of the second light is 350 nm to 600 nm.

—Nematic Liquid Crystal Compound—

The nematic liquid crystal compound is solidified to its liquid crystal phase at the liquid crystal phase transition temperature or lower. The nematic liquid crystal compound is appropriately selected from liquid crystal compounds having a reflectance anisotropy $\Delta n$ of 0.10-0.40, high molecular liquid crystal compounds, and polymerizable liquid crystal compounds. The nematic liquid crystal compound can be used as a solid phase, by aligning while in the liquid crystal state by means of an orientation plate subjected to the rubbing treatment, and then cooling to solidify.

The nematic liquid crystal compound is not particularly limited, and can be appropriately selected depending on the intended purpose. Examples thereof include the compounds expressed by the following structural formulae:

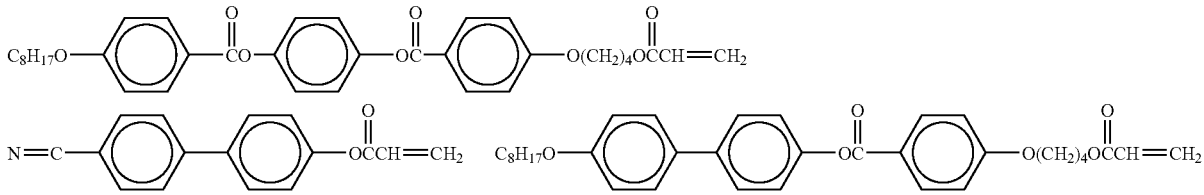

-continued
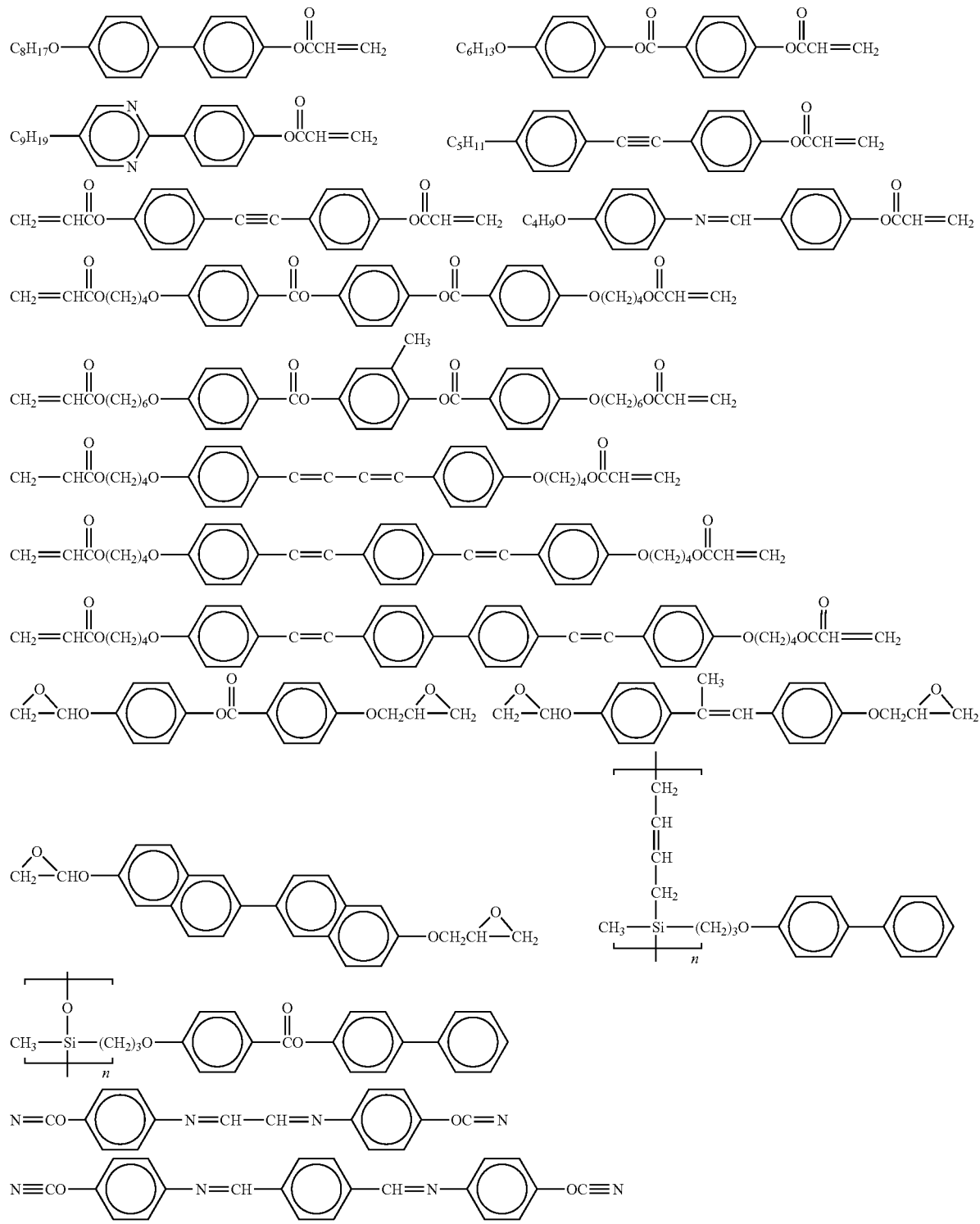
In the above structural formulae, "n" denotes an integer of 1 to 1,000. In the compounds of above structural formulae, their side chain bonding groups can be suitably changed to ones expressed by the following formulae:
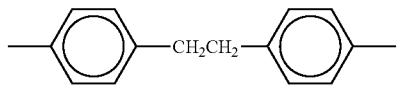

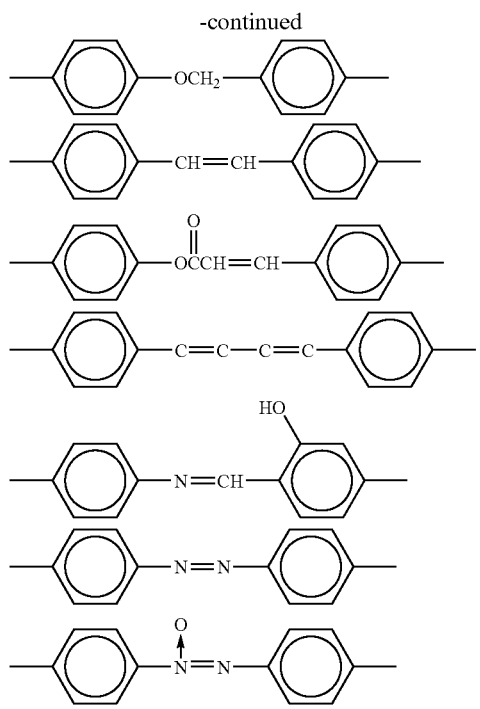

Among the above-listed compounds, the nematic liquid crystal compounds having a polymerizable group in their molecular structure in view of attaining a sufficient curability are preferable. Among them, UV polymerizable liquid crystals are more preferably. The UV polymerizable liquid crystal may be selected from the commercially available products, and examples thereof include PALIOCOLOR LC242 [product name] manufactured by BASF AG, E7 [product name] manufactured by Merck & Co., Inc., LC-Silicon-CC3767 [product name] manufactured by Wacker-Chemie AG, and L35, L42, L55, L59, L63, L79 and L83 [product names] manufactured by Takasago International Corp.

The content of the nematic liquid crystal compound is preferably 30% by mass to 99% by mass, and more preferably 50% by mass to 99% by mass with respect to the total solids mass of each of the laminated cholesteric liquid crystal layers. In the case where the content is less than 30% by mass, the orientation of the nematic liquid crystal compound may become insufficient.

—Chiral Compound—

The chiral compound is not particularly limited, and can be appropriately selected from the known compounds depending on the intended purpose. The chiral compound is preferably an isomannide compound, a catechine compound, an isosorbide compound, a fenchone compound, or a carvone compound in view of improving hue and color purity of the liquid crystal compound. Other than the above-listed compounds, examples thereof include compounds expressed by the following structural formulae:

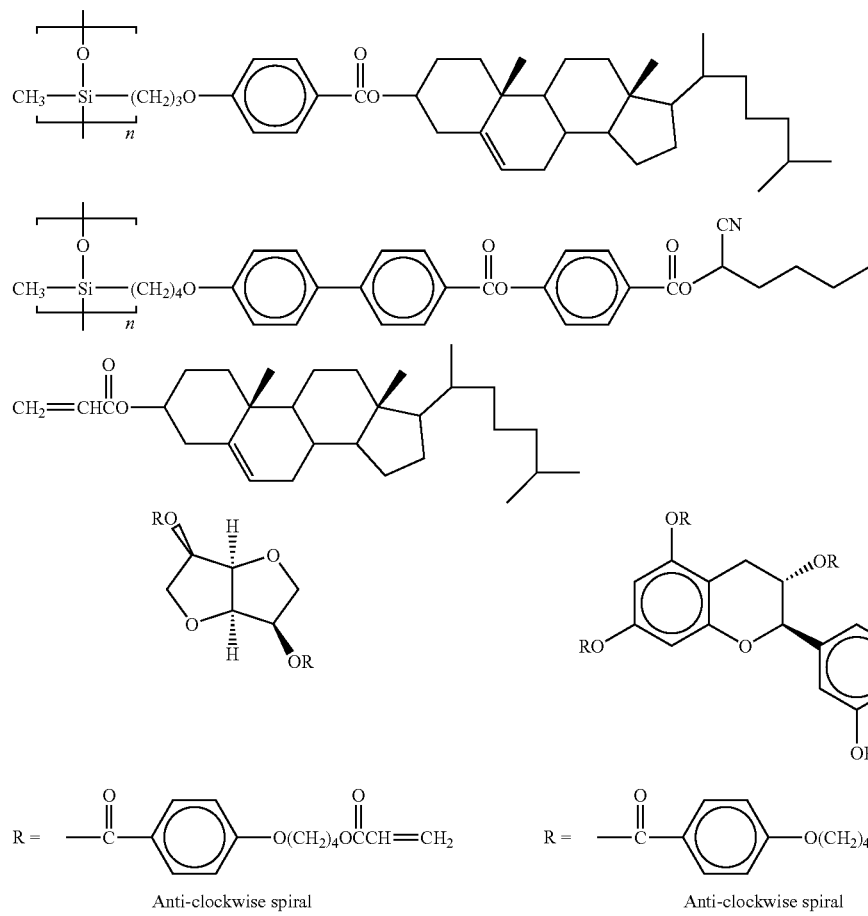

-continued

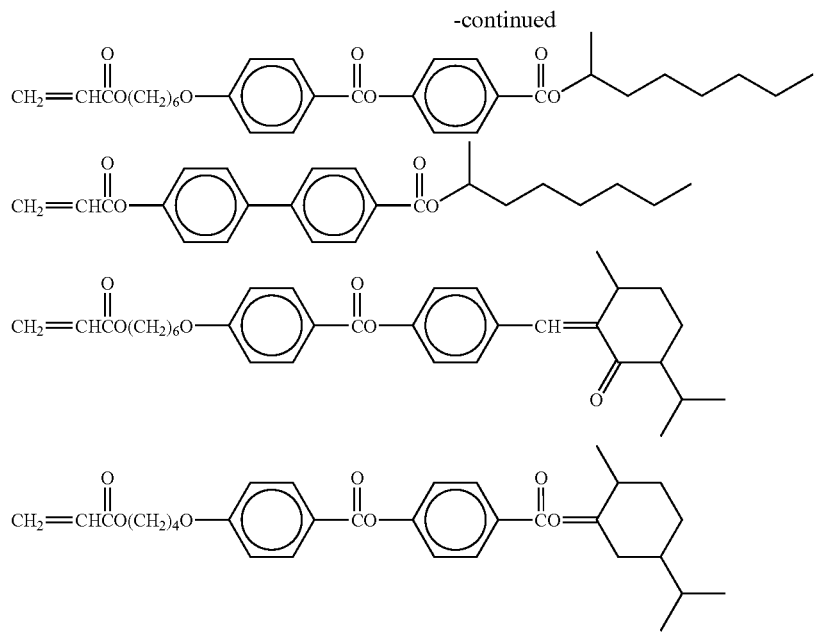

They may be used singly or in combination of two or more.

The chiral compound may be selected from the commercially available products, and examples thereof include S101, R811, and CB15 [product names] manufactured by Merck & Co., Inc., PALIOCOLOR LC756 [product name] manufactured by BASF AG, and the like.

The content of the chiral compound is preferably 30% by mass or less, and more preferably 20% by mass or less, with respect to the total solids mass of each of the laminated cholesteric liquid crystal layers. In the case where the content is more than 30% by mass, the orientation of the cholesteric crystal layer may become insufficient.

—Polymerizable Monomer—

The cholesteric liquid crystal layer optionally contains a polymerizable monomer, for example, for the purpose of improve a curing degree such as a film strength. For example, after irradiating light so as to change (to pattern) the spiral of the liquid crystal, e.g., forming a distribution of the selective reflection wavelength, the spiral structure (selective reflection property) thereof is fixed. By adding the polymerizable monomer in the cholesteric liquid crystal layer, the strength of the fixed cholesteric liquid crystal layer is improved. In the case where the liquid crystal compound has a polymerizable group in its molecular structure, it is however not necessary to add the polymerizable monomer.

The polymerizable monomer is not particularly limited, and can be appropriately selected from the known monomers depending on the intended purpose. Examples thereof include monomers having ethyleny unsaturated bonds therein. Specific examples thereof include polyfunctional monomers such as pentaerythritol tetraacrylate, dipentaerythritol hexaacrylate, and the like.

The specific examples of the monomer having an ethyleny unsaturated bond are compounds expressed by the following structural formulas:

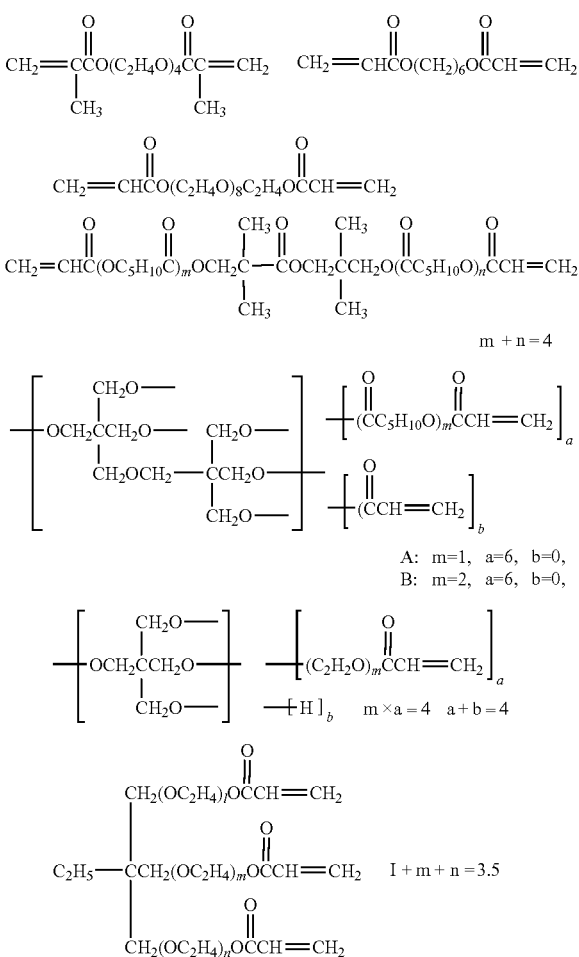

-continued

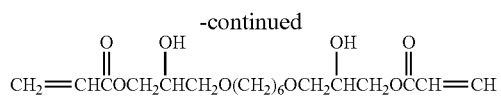

They may be used singly or in combination of two or more.

The content of the polymerizable monomer is preferably 50% by mass or less, and more preferably 1% by mass to 20% by mass with respect to the total solids mass of each of the laminated cholesteric liquid crystal layers. In the case where the content is more than 50% by mass, the orientation of the cholesteric liquid crystal layer may be adversely affected.

—Other Components—

The aforementioned other components are nor particularly limited, and can be appropriately selected depending on the intended purpose. Examples thereof include a photopolymerization initiator, a sensitizer, a binder resin, a polymerization inhibitor, a solvent, a surfactant, a thickener, a dye, a pigment, a UV absorber, a gelling agent, and the like.

The photopolymerization initiator is not particularly limited, and can be appropriately selected from the known products depending on the intended purpose. Examples thereof include p-methoxyphenyl-2,4-bis(trichloromethyl)-s-triazine, 2-(p-buthoxystyryl)-5-trichloromethyl-1,3,4-oxadiazole, 9-phenylacridine, 9,10-dimethylbenzphenazine, benzophenone and Michler's ketone mixture, hexaarylbiimidazole and mercaptobenzoimidazole mixture, and benzyldimethylketal, thioxanthone and amine mixture are available. They may be used singly or in combination of two or more.

The photopolymerization initiator may be selected from the commercially available products. Examples thereof include IRGACUREs 907, 369, 784, and 814 [product names] manufactured by Ciba Specialty Chemicals KK, Lucirin TPO [product name] manufactured by BASF AG.

The content of the photopolymerization initiator is preferably 0.1% by mass to 20% by mass, and more preferably 0.5% by mass to 5% by mass with respect to the total solids mass of each of the laminated cholesteric crystal liquid layers. In the case where the content is less than 0.1% by mass, it may take a long time to cure at the time of radiation since the curing efficiency is low. In the case where the content is more than 20% by mass, the light transmittance becomes low from the ultraviolet light range to the visible light range.

The sensitizer is optionally added in order to increase the curing degree of the cholesteric liquid crystal layer.

The sensitizer is not particularly limited, and can be appropriately selected from the known sensitizers depending on the intended purpose. Examples thereof include diethylthioxanthone, isopropylthioxanthone, and the like.

The content of the sensitizer is preferably 0.001% by mass to 1% by mass with respect to the total solids mass of each of the laminated cholesteric liquid crystal layers.

The binder resin is not particularly limited, and can be appropriately selected from the known resins depending on the intended purpose. Examples thereof includes: polyvinyl alcohols; polystyrene compounds such as polystyrene and poly-α-methylstyrene; cellulose resins such as methylcellulose, ethylcellulose and acetylcellulose; acidic cellulose derivatives including carboxyl group on the side chains; acetal resins such as polyvinyl formal and polyvinyl butyral; copolymers such as methacrylic acid copolymer, acrylic acid copolymer, itaconic acid copolymer, crotonic acid copolymer, malleic acid copolymer, partial-esterified malleic acid copolymer; homopolymers of acrylic acid alkylester or homopolymers of methacrylic acid alkyl ester; and other polymers containing a hydroxyl group. They may be used singly or in combination of two or more.

Examples of the alkyl group in the homopolymers of acrylic acid alkylester or homopolymers of methacrylic acid alkyl ester include a methyl group, an ethyl group, a n-propyl group, a n-butyl group, an iso-butyl group, a n-hexyl group, a cyclohexyl group, a 2-ethylhexyl group, and the like.

Examples of the above-listed other polymers containing a hydroxyl group include an acrylate copolymer of benzyl (meth)acrylate and a methacrylic acid homopolymer, and a multi-component copolymer benzyl(meth)acrylate, (meth) acrylic acid, and other monomers.

The content of the binder resin is preferably 80% by mass or less, and preferably 50% by mass or less, with respect to the total solids mass of each of the laminated cholesteric liquid crystal layers. In the case where the content is more than 80% by mass, the orientation of the cholesteric liquid crystal layer may not be sufficient.

The polymerization inhibitor is not particularly limited, and can be appropriately selected depending on the intended purpose. Examples thereof include hydroquinone, hydroquinone monoethylether, phenothiazine, benzoquinone and derivatives thereof.

The content of the polymerization inhibitor is preferably 10% by mass or less, and more preferably 0.01% by mass (100 ppm) to 1% by mass with respect to the total solids mass of each of the laminated cholesteric liquid crystal layers.

The solvent is not particularly limited, and can be appropriately selected from the known solvents depending on the intended purpose. Examples thereof include: alkoxypropionic acid esters such as methyl-3-methoxypropionate, ethyl-3-methoxypropionate, propyl-3-methoxypropionate, methyl-3-ethoxypropionate, ethyl-3-ethoxypropionate, and propyl-3-ethoxypropionate; alkoxy alcohol esters such as 2-methoxypropylacetate, 2-ethoxypropylacetate, and 3-methoxybutylacetate; lactic acid esters such as methyl-lactate and ethyl-lactate; ketones such as methyl ethyl ketone, cyclohexanone, and methylcyclohexanone; γ-butyrolactone; N-methylpyrrolidone; dimethylsulfoxide; chloroform; and tetrahydrofuran. They may be used singly or in combination of two or more.

—Base—

The base is not particularly limited in terms of its shape, structure, size and the like, and can be appropriately selected depending on the intended purpose. The shape of the base is, for example, a plate or a sheet, the structure thereof is a single layered structure or a laminate structure, and the size is appropriately adjusted depending on the size of the filter for an optical recording medium and the like.

The base is used at least a part of a first gap layer or a second gap layer.

The material of the base is not particularly limited, and can be selected from inorganic materials and organic materials.

Examples of the inorganic material include a glass, a quartz glass, silicone, and the like.

Examples of the organic material include acetate resins such as triacetyl cellulose, polyester resins, polyethersulfone resins, polysulfone resins, polycarbonate resins, polyamide resins, polyimide resins, polyolefin resins, acrylic resins, polynorbornene resins, cellulose resins, polyarylate resins, polystyrene resins, polyvinylalcohol resins, polyvinylchloride resins, polyvinylidenechloride resins, polyacrylic resins, and epoxy resins. Among them, polycarbonate resin, acrylic resin, triacetylcellulose resin, and polyolefin resin are preferable. They may be used singly or in combination of two or more.

The base may be appropriately synthesized or selected from the commercially available products.

The thickness of the base is not particularly limited, and can be appropriately selected depending on the purpose. For example, the thickness thereof is preferably 10 μm to 500 μm, and more preferably 50 μm to 300 μm. In the case where the thickness of the base is less than 10 μm, the adhesion thereof is lowered due to the bending of the substrate. In the case where the thickness of the base is more than 500 μm, it is necessary to widely sift the focal point of the information light from the focal point of the reference light, or vise-vase, and thus a size of the optical system becomes large.

As a method for forming the filter for an optical recording medium, the filter is suitably formed in accordance with the method for forming an optical recording medium of the present invention which will be described later. For example, each cholesteric liquid crystal layer is formed by coating a coating liquid for the liquid crystal layer prepared with the aforementioned solvent on the base in accordance with the appropriately selected coating method.

As the most production efficient method, the following process is preferred. The base is wound in a roll shape in advance, and the coating liquid is applied on the base with a long pitched continuous coater, such as a bar coater, a die coater, a blade coater, and a curtain coater.

The thickness of each cholesteric liquid crystal layer is preferably 1 μm to 10 μm, and more preferably 2 μm to 7 μm. In the case where the thickness is less than 1 μm, the selective reflectance is not sufficient. In the case where the thickness is more than 10 μm, the uniform orientation of the liquid crystal layer is disturbed.

The thickness of the filter for an optical recording medium (the total thickness of the cholesteric liquid crystal layers excluding the thickness of the base) is preferably 1 μm to 30 μm, and more preferably 3 μm to 10 μm.

Each of the cholesteric liquid crystal layers is not particularly limited, and can be appropriately selected depending on the intended purpose. Preferable examples thereof include one wherein the coating liquid for each of the cholesteric liquid crystal layers is applied onto the base, orientated, solidified, cut into a disk shape with the base, and disposed on the second substrate. In the case where the cholesteric liquid crystal layers are used for a filter for an optical recording medium, the coated cholesteric liquid crystal layers are disposed directly on the second substrate, without disposing a base therebetween.

The filter for an optical recording medium is widely applicable for various fields, and is suitably used in the formation and/or manufacturing of a holographic optical recording medium. Especially, the filter for an optical recording medium is preferably used in the holographic optical recording medium, the method for forming the same, the optical recording method, and the optical reproducing method of the present invention described hereinafter.

—First Substrate—

The first substrate is not particularly limited in terms of its shape, structure, size or the like, and can be appropriately selected depending on the intended purpose. Examples of the shape thereof include a disk-shape, a card-shape, and the like. The material for the substrate should be selected from materials which can maintain a physical strength of the optical recording medium. In the case where the recording light (information light and reference light) or the reproduction light is irradiated through the substrate, the substrate needs to be sufficiently transparent at the wavelength range of the light to be applied.

The material of the first substrate is generally selected from a glass, ceramics, resins, and the like. The resin is particularly preferable in view of the molding capability, and cost performance.

Examples of the resin include a polycarbonate resin, an acrylic resin, an epoxy resin, a polystyrene resin, acrylonitril-styrene copolymer, a polyethylene resin, a polypropylene resin, a silicone resin, a fluorine resin, an ABS resin, a urethane resin, and the like. Among these resins, the polycarbonate resin and the acrylic resin are preferable in view of the molding capability, optical properties, and cost performance.

The first substrate can be the one arbitrary synthesized, or selected from the commercially available products.

The thickness of the first substrate is not particularly limited, and can be appropriately selected depending on the intended purpose. The thickness is preferably 0.1 mm to 5 mm, and more preferably 0.3 mm to 2 mm. When the thickness is less than 0.1 mm, the distortion in the shape of the disk may not be prevented at the time of being stored. When the thickness is more than 5 mm, the weight of the disk itself becomes large, and thus excessive load may be applied on the drive motor.

—Second Substrate—

The second substrate may be identical to or different from the first substrate in terms of its shape, structure, size, material, and thickness. The second substrate preferably has the same shape and size to those of the first substrate.

With the second substrate, address-servo area as multiple address fixing area linearly extended toward the radius direction is arranged with certain periodic angle, and a sector section between adjoining address-servo area is arranged for the data area. In address-servo area, information for the focusing servo and tracking servo with sampled servo method and an address information are recorded with emboss pit (servo pit) in advance (pre-formatted). Besides, a focusing servo can be carried out with the surface of the reflective film. As information for the tracking servo, for example, wobble pit and groove are available. Besides, in the case where the optical recording medium is card shape, the servo pit pattern is not required.

—Reflective Film—

The reflective film is formed on the surface of the servo pit pattern of the second substrate.

The material of the reflective film is preferably a material having a high reflectance to the information light and the reference light. In the case where the wavelength of the light to be applied is 400 nm to 780 nm, the material of the reflective film is preferably Al, an Al alloy, Ag, an Ag alloy, or the like. In the case where the wavelength of the light to be applied is more than 650 nm, the material of the reflective film is preferably Al, an Al alloy, Ag, an Ag alloy, Au, a Cu alloy, TiN, or the like.

As well as reflecting the light, the reflective film functions as to record and rewrite directory information without adversely affecting the recorded hologram, by means of an optical recording medium capable of writing or erasing, such as a digital video disk (DVD). Such the directory information includes, for example, information regarding the area the hologram has been recorded, when it has been rewritten, in which area an error has existed, and how an alternating process has been performed.

The forming method of the reflective film is not particularly limited, and can be appropriately selected depending on the intended purpose. Examples thereof include a vacuum deposition method, a sputtering method, a plasma CVD method, a photo CVD method, an ion plating method, an electron beam vapor deposition method, and the like. Among them, the sputtering method is preferable in view of the production efficiency, and quality of the formed film.

The thickness of the reflective film is preferably 50 nm or more so as to realize sufficient reflectance, and more preferably 100 nm or more.

—Other Layers—

Other layers are not particularly limited, and can be appropriately selected depending on the intended purpose. Examples thereof include a first gap layer, a second gap layer, and the like.

—First Gap Layer—

The first gap layer is optionally disposed between the filter layer and the reflective film for the purpose of smoothing the surface of the second substrate. It is also effective in controlling the size of the hologram formed in the recording layer. Specifically, it is necessary to control the size of the interference region of the reference light and the information light for recording at a certain size in the recording layer, it is effective to dispose a gap between the recording layer and the servo pit pattern.

The first gap layer is formed, for example, by coating a material, such as a UV curable resin, on the servo pit pattern in accordance with a spin coating method or the like, and curing the coated material. Moreover, when the filter layer is coated and formed on a transparent base, the transparent base functions as the first gap layer.

The thickness of the first gap layer is not particularly limited, and can be appropriately selected depending on the intended purpose. The thickness thereof is preferably 1 μm to 200 μm.

—Second Gap Layer—

The second gap layer is optionally disposed between the recording layer and the filter layer.

The material of the second gap layer is not particularly limited, and can be appropriately selected depending on the intended purpose. Examples thereof include transparent resin films, such as triacetylcellulose (TAC), polycarbonate (PC), polyethyleneterephthalate (PET), polystyrene (PS), polysulfone (PSF), polyvinylalcohol (PVA) and polymethylmethacrylate (PMMA), and norbornene resin films such as ARTON [product name, manufactured by JSR Corp.], and ZEONOA [product name, manufactured by Zeon Corp]. Among them, the materials having high isotropy are preferable, and TAC, PC, ARTON [product name] and ZEONOA [product name] are more preferable. Moreover, the second gap layer can be formed with a UV curable resin, a thermosetting resin, or a two-component curable resin.

The forming method thereof is not particularly limited, and can be appropriately selected depending on the intended purpose. Examples thereof include a spin coating, a screen printing, and the like.

The thickness of the second gap layer is not particularly limited, and can be appropriately selected depending on the purpose. The thickness thereof is preferably 1 μm to 200 μm.

Hereinafter, the concrete examples of the embodiments of the present invention are described in details with reference to the drawings.

First Embodiment

Figure 12:
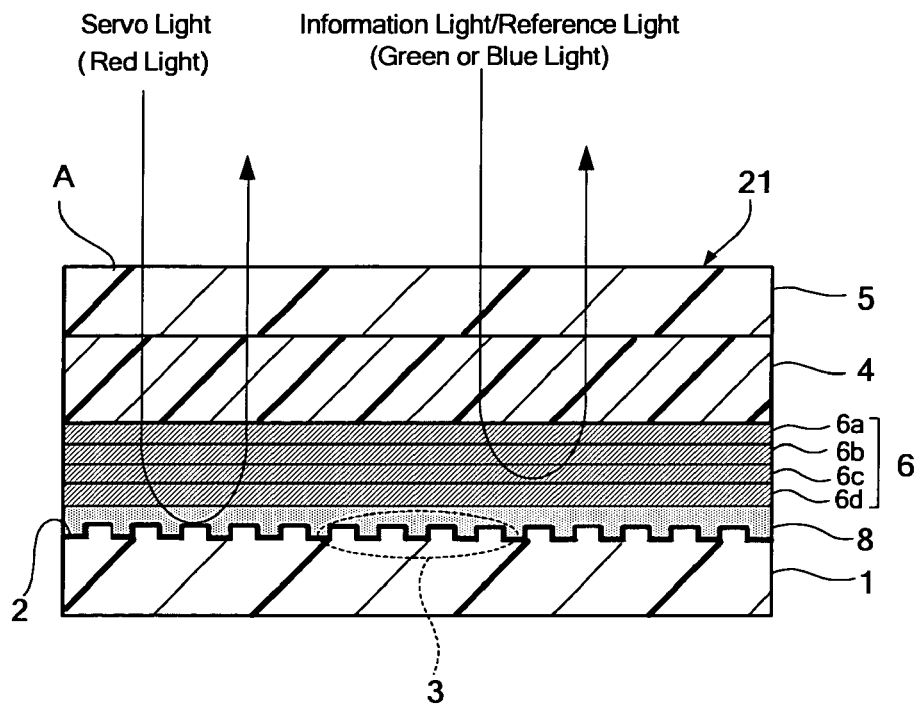
FIG. 12 is a schematic cross-sectional diagram showing an example of the optical recording medium according to the first embodiment of the present invention.

FIG. 12 is a schematic cross-sectional view showing the structure of the optical recording medium 21 of the first embodiment of the present invention. In an optical recording medium 21 according to the first embodiment, a servo pit pattern 3 is formed on a substrate 1 made of polycarbonate resin or glass, and the serve pit pattern 3 is coated with Al, Au, Pt or the like to form a reflective film 2. Although the servo pit pattern 3 is formed on the entire surface of the second substrate 1 in FIG. 12, it may be formed on the second substrate 1 periodically. In addition, the height of the servo pit pattern 3 is 100 nm (1,000 Å) at maximum, which is far smaller than those of the other layers, including substrates.

A first gap layer 8 is formed by applying a UV curable resin or the like on the reflective film 2 of the second substrate 1 by spin coating or the like. The first gap layer 8 is effective for protecting the reflective film 2 and for adjusting the size of holograms created in a recording layer 4. Specifically, since somewhat large regions where optical interference between information light and recording reference light takes place need to be secured in the recording layer 4, it is effective to provide a gap between the recording layer 4 and the servo pit pattern 3.

A filter layer 6 is provided on the first gap layer 8, and the recording layer 4 is sandwiched between the filter layer 6 and a first substrate (a polycarbonate resin substrate or glass substrate) to constitute the optical recording medium 21.

In FIG. 12, the filter layer 6 admits only red light 10 and reflects light of the other colors. Therefore, the information light and recording and reproduction light 11 do not pass through the filter layer 6 because they are light of green or blue, and never reach the reflective film 2, becoming returning beams of light emitting from the light entrance/exit surface A.

The filter layer 6 is a laminate of four cholesteric liquid crystal layers 6a, 6b, 6c and 6d. The filter layer 6 may be directly provided on the first gap layer 8 with a coating method, or may be provided by stamping a film in which four cholesteric liquid crystal layers are laminated on a base into the optical disc shape.

The optical recording medium 21 of the first embodiment may be in a disc shape or card-like shape. There is no need to provide a servo pit pattern in a case where the optical recording medium 21 is a card-like shape. In the optical recording medium 21, the second substrate 1 is 0.6 mm in thickness, the first gap layer 8 is 100 μm in thickness, the filter layer 6 is 1 μm in thickness, the recording layer 4 is 0.6 mm in thickness, and the first substrate 5 is 0.6 mm in thickness, bringing to the total to about 1.9 mm.

Next, optical operations around the optical recording medium 21 will be described with reference to FIG. 14.

First, a red light beam 10 emitted from the servo laser source is reflected by a dichroic mirror 13 by almost 100%, and passes through an objective lens 12. By this, the servo light 10 is applied onto the optical recording medium 21 in such a way that it focuses on the reflective film 2. More specifically, the dichroic mirror 13 is so configured that it admits only green or blue light but reflects almost 100% of red light. The servo light incident from the light entrance/exit surface A of the optical recording medium 21 passes through the first substrate 5, recording layer 4, filter layer 6 and first gap layer 8, is reflected by the reflective film 2, and passes again through the first gap layer 8, filter layer 6, recording layer 4 and first substrate 5 to emit from the light entrance/exit surface A. The returning servo light passes through the objective lens 12 and is reflected by the dichroic mirror by almost 100%, and then a servo information detector (not shown) detects servo information in the returning servo light. The detected servo information is used for the focus servo operation, tracking servo operation, slide servo operation, and the like. The holographic material containing the recording layer 4 is designed so as not to be sensitive to red light. For this reason, even when the servo light has passed through the recording layer 4 or has been reflected diffusively by the reflective film 2, the recording layer 4 is not adversely affected. In addition, the returning servo light that has been reflected by the reflective film 2 is reflected by the dichroic mirror 13. Accordingly, the servo light is not detected by a CMOS sensor or CCD 14 used for the detection of reconstructed images, and thus does not interfere with the operation of diffracted light.

The information light and the reference light are applied to the location information pattern recorded in the recording layer 4, the reflective light therefrom is received, and the deviation ΔL is calculated based thereon. The applying locations of the information light and the reference light are adjusted based on the deviation ΔL, and the information light and the reference light are generated by the space-light modulator 25.

Both the information light and the recording reference light 11 emitted from recording/reproduction laser light source and generated by the space-light modulator 25 pass through a polarizing plate 16 and are linearly polarized. The linearly polarized beams of the light then pass through a half mirror 17 and are circularly polarized after passing through a quarter wave plate 15. The circularly polarized light then passes through the dichroic mirror 13 and the objective lens 12, and is applied onto the optical recording media 21 in such a way that optical interference takes place between the information light and the reference light to create interference images in the recording layer 4. The information light and reference light are incident from the light entrance/exit surface A and interact with each other in the recording layer 4 to form an interference image to be recorded there. Thereafter, the information light and the reference light pass through the recording layer 4, launching into the filter layer 6. There, before reaching the bottom of the filter layer 6, the information light and the reference light are reflected and become returning light. More specifically, the information light and recording reference light do not reach the reflective film 2. This is because the filter layer 6 is formed of a single-layered cholesteric liquid crystal layer whose helical pitch is continuously changed in the thickness direction thereof and thus admits only red light. Moreover, if the intensity of light that has undesirably passed through the filter layer 6 is suppressed to 20% or less of that of the incident light, there will be no practical problems even when such light reaches the bottom of the filter layer 6 and is reflected back as returning light, because this returning light is again reflected by the filter layer 6 and its intensity in reproduction light is as small as 4% (20%×20%) or less of that of the diffracted light.

—Fixing of the Recording—

After the interference image is recorded on the recording layer 4, the fixing light is irradiated to the recorded regions at least within 28 hours, and then the recording of the interference image is fixed.

Second Embodiment

Figure 7:
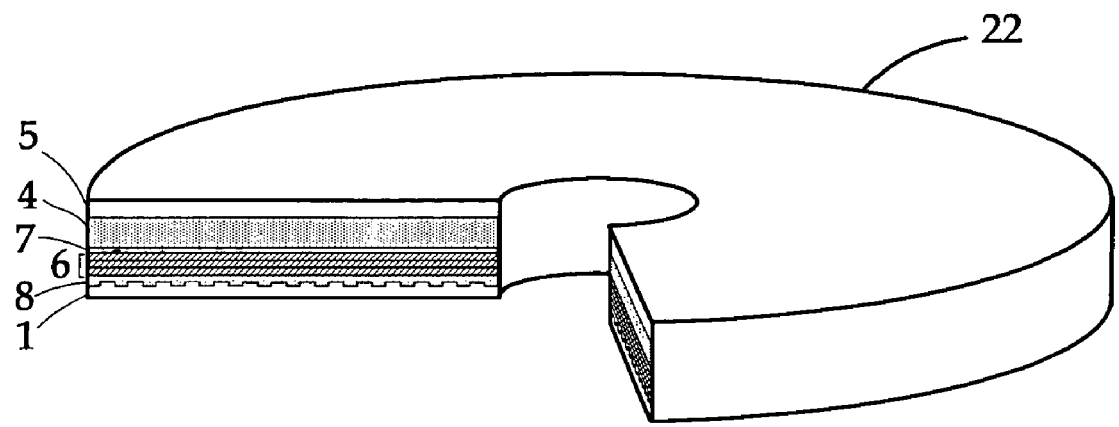
FIG. 7 is a schematic cross-sectional diagram showing a structure of an optical recoding medium.
Figure 13:
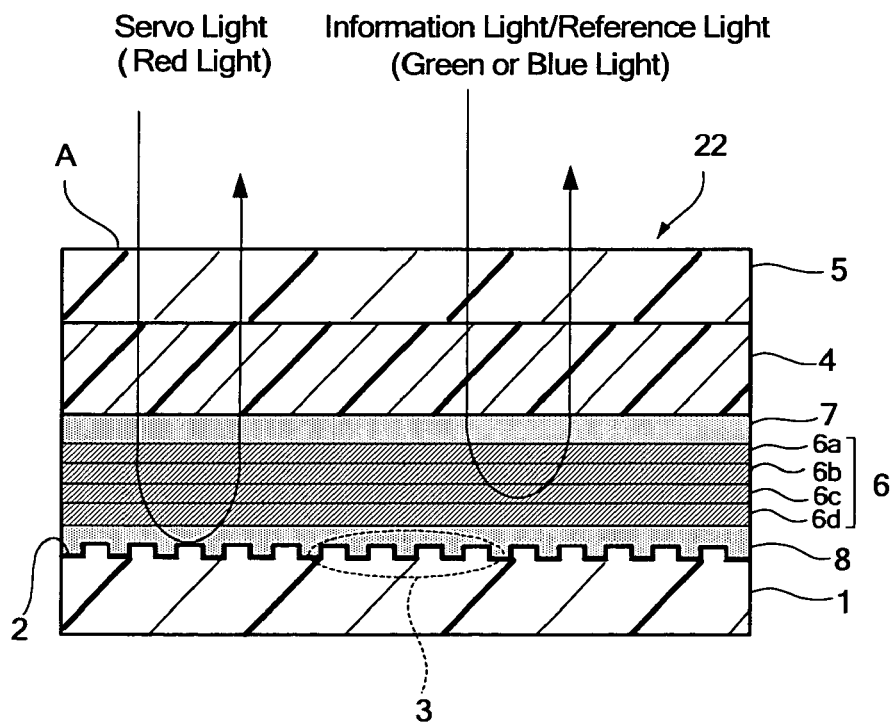
FIG. 13 is a schematic cross-sectional diagram showing an example of the optical recording medium according to the second embodiment of the present invention.

FIG. 13 is a schematic cross-sectional view showing the structure of the optical recording medium 22 according to the second embodiment of the present invention. FIG. 7 is a perspective diagram wherein the optical recording medium 22 is partially cut and removed. The optical recording medium 22 has the identical exterior shape to that of the optical recording medium 21 shown in FIG. 12. In an optical recording medium 22 according to the second embodiment, a servo pit pattern 3 is formed on a substrate 1 made of polycarbonate resin or glass, and the serve pit pattern 3 is coated with Al, Au, Pt or the like to form a reflective film 2. The height of the servo pit pattern 3 is generally the same as in the first embodiment.

After forming a first gap layer 8, a filter layer 6 which is a laminate of four cholesteric liquid crystal layers is formed on the first gap layer, as in the case of the first embodiment.

In the second gap layer 7, there is a point at which both information light and reference light focus; if this area is embedded in photopolymers, excessive exposure takes places and thus an excess amount of monomers are consumed, leading to poor multiplexing recording performance. To avoid this, it is effective to provide a transparent, inert second gap layer.

In the optical recording medium 22, the second substrate 1 is 1.0 mm in thickness, the first gap layer 8 is 100 μm in thickness, the filter layer 6 is 1 μm in thickness, the second gap layer 7 is 70 μm in thickness, the recording layer 4 is 0.6 mm in thickness, and the first substrate 5 is 0.4 mm in thickness, bringing to the total to about 2.2 mm.

Upon recording and reproduction of information, the optical recording medium 22 having the structure described above is irradiated with red servo light and green information light and green recording and reproduction reference light. The servo light is incident from the light entrance/exit surface A, transmits through the recording layer 4, second gap layer 7, filter layer 6 and first gap layer 8, and is reflected by the reflective film 2 to become returning servo light. This returning servo light sequentially passes through the first gap layer 8, filter layer 6, second gap layer 7, recording layer 4 and first substrate 5 again, and emits from the light entrance/exit surface A. The emitted returning servo light is used for the focus servo operation, tracking servo operation, and the like. The holographic material constituting the recording layer 4 is designed so as not to be sensitive to red light. For this reason, even when the servo light has passed through the recording layer 4 or has been reflected diffusively by the reflective film 2, the recording layer 4 is not adversely affected. The green information and reference light is incident from the light entrance/exit surface A and passes through the recording layer 4 and second gap layer 7, and reflected by the filter layer 6 to become returning light. The returning light sequentially pass through the second gap layer 7, recording layer 4 and first substrate 5, and emit from the light entrance/exit surface A. Upon reproduction of information, both reproduction reference light and reproduction light generated by irradiating the recording layer 4 with the reproduction reference light do not reach the reflective film 2 and emit from the light entrance/exit surface A.

—Fixing of the Recording—

The fixing of the recording is performed in the same manner as in the first embodiment.

(Method for Manufacturing the Optical Recording Medium)

The method for manufacturing the optical recording medium of the present invention contains a filter layer formation step, a reflective film formation step and a recording layer formation step, and further contains other steps, if necessary.

—Filter Layer Formation Step—

The filter layer formation step is a step for forming a filter layer which is formed of a laminate wherein two or more cholesteric liquid crystal layers mentioned above are laminated on a second substrate.

In the filter layer forming step, it is preferable in view of the production efficiency that the aforementioned filter for an optical recording medium is processed into an optical recording medium shape, and the processed filter is bonded to the second substrate to form a filter layer.

The shape of the optical recording medium is, for example, disc shape or card-like shape.

The method for processing the filter into a shape of the optical recording medium is not particularly limited, and can be appropriately selected depending on the intended purpose. For example, a cutting process with a press cutter, a stamping process with a stamping cutter, or a burning-off process with a laser cutter can be used.

The filter is bonded to the second substrate by use of, for example, an adhesive or tackiness agent in a manner such that no air bubble is trapped therebetween.

The adhesive is not particularly limited and can be appropriately selected depending on the intended purpose. Examples thereof include UV curable adhesives, emulsion adhesives, one-component curable adhesives and two-component curable adhesives. These known adhesives can be used in any combination.

The tackiness agent is not particularly limited and can be appropriately selected depending on the intended purpose; examples thereof include rubber agents, acrylic agents, silicone agents, urethane agents, vinylalkyl ether agents, polyvinylalcohol agents, polyvinylpyrrolidone agents, polyacrylamide agents and cellulose agents.

The lamination method of the cholesteric liquid crystal layers is not particularly limited, and can be appropriately selected depending on the intended purpose. Examples thereof include the following (1)-(5):

(1) A method wherein each cholesteric liquid crystal layers is prepared separately, and the prepared cholesteric liquid crystal layers are laminated via the adhesive or tackiness agent.
(2) A method wherein each cholesteric liquid crystal layers is prepared separately, and the prepared cholesteric liquid crystal layers are laminated by thermo-compression bonding.
(3) A method wherein each cholesteric liquid crystal layers is prepared separately, and the prepared cholesteric liquid crystal layers are laminated by fusing the interferences of the cholesteric liquid crystal layers.
(4) A method wherein a cholesteric liquid crystal layer is coated to form a film, and another cholesteric liquid crystal layer is further coated on the formed cholesteric liquid crystal layer to form a laminate.
(5) A method wherein a cholesteric liquid crystal layer is formed on a transparent base, and another cholesteric liquid crystal layer is further coated and formed on the transparent base to form a laminate.

Among the above-listed method, the coating-lamination method (5) is preferable in view of the production efficiency, and cost performance.

In the lamination method (1), the adhesive and tackiness agent are not particularly limited, and can be appropriately selected depending on the intended purpose. Examples thereof include a UV curable adhesive, an acrylic agent, and the like. The applied thickness of the adhesive or tackiness agent is not particularly limited, and can be appropriately selected depending on the intended purpose. In the case of the adhesive, the thickness is preferably 0.1 μm to 10 μm, and more preferably 0.1 μm to 5 μm, in view of the optical properties and thinning effects. In the case of the tackiness agent, the thickness is preferably 1 μm to 50 μm, and more preferably 2 μm to 30 μm.

In the lamination method (2), the method of the thermo-compression bonding is, for example, a heat-seal method, an ultrasonic method, an impulse seal method, or a high frequency sealing method.

In the lamination method (3), the method of fusing is, for example, applying a solvent which slightly dissolves and/or swells the cholesteric liquid crystal layer, and integrating the cholesteric liquid crystal layers by the fusion of the interferences thereof.

Examples of the solvent which slightly dissolves and/or swells the cholesteric liquid crystal layer include: aromatic compounds such as toluene, benzene, xylene and the like; alcohols such as methanol, ethanol, and the like; cyclic hydrocarbons such as cyclohexane, cyclopentane, and the like; ketones such as acetone, methyl ethyl ketone (MEK) and the like; ethers such as isopropylether, and the like; esters such as ethylacetate, and the like; and chloride solvents such as chloroform, dichloromethane, and the like. Among them, toluene, cyclohexane, cyclopentane, methyl ethyl ketone (MEK), isopropylalcohol are especially preferable.

In the lamination method (4), the coating method is not particularly limited, and can be selected depending on the intended purpose. Examples thereof include an inkjet method, a spin-coating method, a kneader-coating method, a bar-coating method, a dye-coating method, a blade-coating method, a casting method, a dipping method, a curtain-coating method, and the like.

The formation of the cholesteric liquid crystal layer in accordance with the coating method is preferable performed, for example, by using (applying and drying) a solution (coating liquid) wherein the cholesteric liquid crystal layer material is dissolved in a solvent.

In the case the UV curable is optionally performed on the coated layer, the conditions thereof are not particularly limited, and can be appropriately adjusted depending on the intended purpose. The irradiating UV ray is preferably of 160 nm to 380 nm, and more preferably of 250 nm to 380 nm. The exposure duration is preferably 10 seconds to 600 seconds, and more preferably 10 seconds to 300 seconds with the exposure luminance of 10 mW/cm$^2$. In the case where the exposure luminance is reduced to 1 mW/cm$^2$, the exposure duration is not significantly varied as the addition amount of the reaction initiator is generally increased, and is preferably 10 seconds to 600 second, and more preferably 10 seconds to 300 seconds.

In the lamination method (5), the material for the transparent base can be an inorganic material or organic material. Examples of the inorganic material include a glass, a quartz glass, silicone, and the like. Examples of the organic material include: acetate resins such as triacetylcellulose; polyester resins; polyethersulfone resins; polysulfone resins; polycarbonate resins; polyamide resins; polyimide resins; polyolefin resins; acrylic resins; polynorbornene resins; cellulose resins; polyarylate resins; polystyrene resins; polyvinylalcohol resins; polyvinylchloride resins; polyvinylidenechloride resins; polyacrylic resins; and the like. These may be used singly or in combination of two or more.

(Optical Reproducing Method)

The optical reproducing method of the present invention reproduce information by applying reference light to the interference image recorded in the recording layer 4 in accordance with the optical recording method of the present invention. In order to apply the reference light to the interference image recorded in the recording layer 4, as shown in FIG. 14, the focal point of the reference light is set to where the interference image is recorded within the recording layer 4, and then the reference light is applied. As a result of the application the reference light, diffracted light is generated, and the diffracted light is passed through the objective lens 12, and further passed through the dichroic mirror 13, and a quarter wave plate 15. The transmitted light is reflected by a half mirror 17, and the information is reproduced from the diffracted light detected by a detector 14.

Here, the reference light is applied at the same angle to an incident angle of the reference light applied at the time of recording the interference image so as to reproduce the recorded image.

In the optical recording and reproducing method, information light with the two-dimensional intensity distribution and reference light with almost the same light intensity to that of the information light are superimposed inside the photosensitive recording layer, the resulted interference pattern formed inside the recording layer induces a distribution of the optical properties of the recording layer to thereby record such the distribution as information. When the recorded information is read (reproduced), only reference light is irradiated to the recording layer from the same direction to that irradiated at the time of recording, a light having a intensity distribution corresponding to the distribution of the optical property formed inside the recording layer is emitted from the recording layer as diffracted light.

The optical recording and reproducing method for the second embodiment is performed, for example, by means of an optical recording and reproducing apparatus explained hereinafter.

The optical recording and reproducing apparatus applied in the aforementioned optical recording and reproducing method is explained with reference to FIG. 15.

Figure 15:
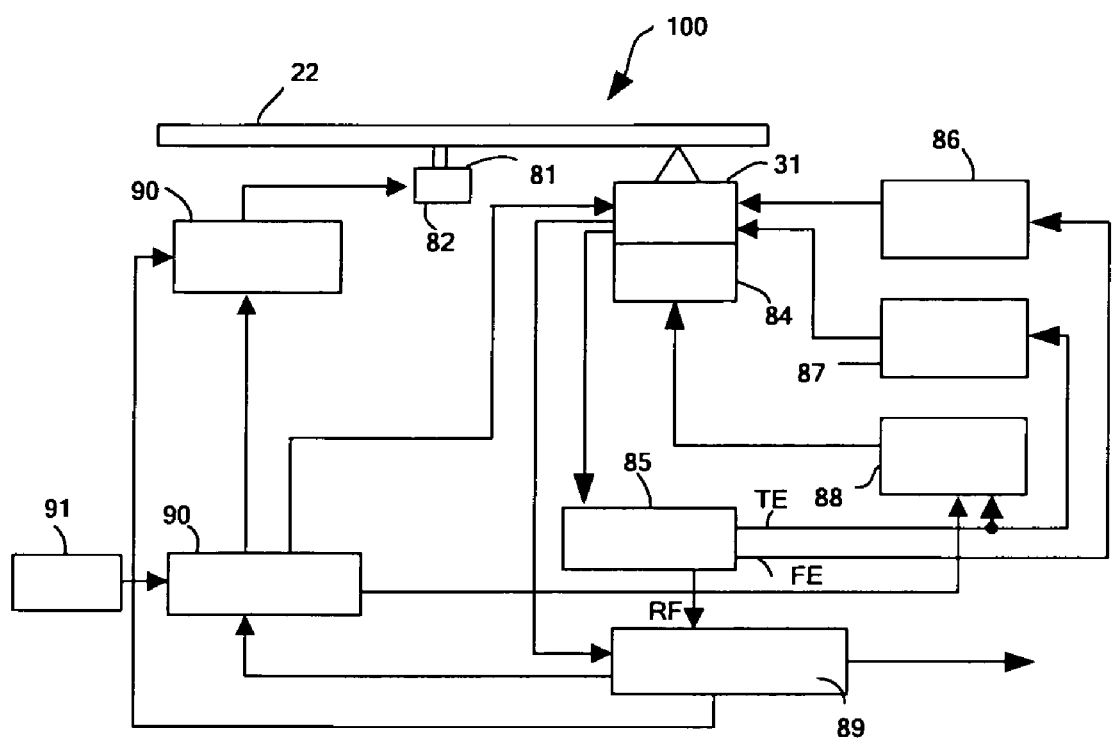
FIG. 15 is a block diagram showing an example of a whole configuration of the optical recording and reproducing apparatus of the present invention.

FIG. 15 is a whole structural diagram of the optical recording and reproducing apparatus according to an example of the present invention. Note that, the optical recording and reproducing apparatus contains both of the optical recording apparatus and the optical reproducing apparatus.

This optical recording and reproducing apparatus 100 is equipped with a spindle 81 on which an optical recording medium is deposed 22, a spindle motor 82 which rotates the spindle 81, and a spindle servo circuit 83 which controls the spindle motor 82 so as to maintain the optical recording medium 20 at the predetermined revolution number.

The optical recording and reproducing apparatus 100 is also equipped with a pickup unit 31 which irradiates information light and reference light to the optical recording medium so as to record information, and irradiates reference light for reproducing to the optical recording medium 22 so as to detect diffracted light to thereby reproduce the recorded information, and a driving unit 84 which enables the pickup unit 31 to move in the radius direction of optical recording medium 22.

The optical recording and reproducing apparatus 100 is equipped with a detecting circuit 85 which detects focusing error signal FE, tracking error signal TE, and reproducing signal RF from the output signal of the pickup unit 31, a focusing servo circuit 86 which drives an actuator in the pickup unit 31 so as to move an objective lens (not shown in FIG. 15) to the radium direction of the optical recording medium 22 based upon the focusing error signal FE detected by the detecting circuit 85 to thereby perform focusing servo, a tracking servo circuit 87 which drives an actuator in the pickup unit 31 so as to move an objective lens (not shown in FIG. 15) to the radium direction of the optical recording medium 22 based upon the tracking error signal TE detected by the detecting circuit 85 to thereby perform tracking servo, and a sliding servo unit 88 which controls the driving unit 84 based upon the tracking error signal TE and an indication from a controller mentioned hereinafter so as to move the pickup unit 31 to the radius direction of the optical recording medium 22 to thereby perform sliding servo.

Moreover, the optical recording and reproducing apparatus 100 is equipped with a signal processing circuit 89 which decodes output data of the later described CMOS or CCD array in the pickup unit 31, to thereby reproduce the data recorded in the data area of the optical recording medium 22, and reproduces the standard clock or determines the address based on the reproducing signal RF from the detecting circuit 85, a controller 90 which controls the whole optical recording and reproducing apparatus 100, and a controlling unit 91 which gives various instructions.

The controller 90 is configured to input the standard clock or address information outputted from the signal processing circuit 89 as well as controlling the pickup unit 31, the spindle servo circuit 83, the slid servo circuit 88, and the like. The spindle servo circuit 83 is configured to input the standard clock outputted from the signal processing circuit 89. The controller 90 contains CPU (center processing unit), ROM (read only memory), and RAM (random access memory), the CPU realizes the function of the controller 90 by executing programs stored in the ROM on the RAM, a working area.

The optical recording and reproducing apparatus applied for the optical recording and reproducing method uses the optical medium of the present invention. Therefore, the optical recording and reproducing apparatus inhibits any shift of the selective reflection wavelength at the time when the incident angle is changed, prevents the information light and the reference light from being diffused reflected from the reflective film of the optical recording medium, prevents the generation of noises, and realizes high density recording which has not been realized before.

A prophetical example of the present invention will be explained hereinafter, but it is not intended to limit the scope of the present invention thereby.

EXAMPLE 1

In order to carry out the optical recording method of the present invention, a filter for an optical recording medium is prepared first, and then the prepared filter is laminated on a substrate so as to prepare an optical recording medium.

—Preparation of the Filter for the Optical Recording Medium—

Onto a polycarbonate film (product name: Iupiron; the manufacturer: Mitsubishi Gas Chemical Co., Inc.) having a thickness of 100 µm, polyvinyl alcohol (product name: MP203; the manufacturer: KURARAY CO., LTD.) is applied so as to have the applied thickness of 1 µm, to thereby prepare a base film as the base. The thus prepared base film is passed through a rubbing devise so as to subject the polyvinyl alcohol surface of the base film to the rubbing process, to thereby provide the base film a function for orientating liquid crystals.

Sequentially, cholesteric liquid crystal layer coating liquids A, B, C having the compositions presented in Table 1 are prepared in accordance with the conventional manner.

TABLE 1

| Component | Cholesteric liquid crystal layer coating liquid | | |
|---|---|---|---|
| (part by mass) | A | B | C |
| UV polymerizable liquid crystal | 93.16 | 94.02 | 94.74 |

TABLE 1-continued

| Component | Cholesteric liquid crystal layer coating liquid | | |
|---|---|---|---|
| (part by mass) | A | B | C |
| Chiral agent | 6.84 | 5.98 | 5.26 |
| Photopolymerization Initiator | 0.10 | 0.10 | 0.10 |
| Sensitizer | 0.02 | 0.02 | 0.02 |
| Solvent | 400 | 400 | 400 |

UV polymerizable liquid crystal: PALIOCOLOR LC2422 [product name], manufactured by BASF AG
Chiral agent: PALIOCOLOR LC756 [product name], manufactured by BASF AG
Photopolymerization initiator: Irga Cure 369 [product name], manufactured by Ciba Specialty Chemicals KK
Sensitizer: diethylthioxanthone
Solvent: methyl ethyl ketone (MEK)

Onto the base film, the cholesteric liquid crystal layer coating liquid A is applied by means of a bar coater, and is dried. Thereafter, the orientation thereof is matured at 110° C. for 20 seconds. It is then exposed to a ultra-high pressure mercury lamp having an exposure energy of 500 mJ/cm$^2$ at 110° C., to thereby form a cured cholesteric liquid crystal layer A having a thickness of 2 μm.

Onto the cholesteric liquid crystal layer A, the cholesteric liquid crystal layer coating liquid B is applied by means of a bar coater, and is dried. Thereafter, the orientation thereof is matured at 110° C. for 20 seconds. It is then exposed to a ultra-high pressure mercury lamp having an exposure energy of 500 mJ/cm$^2$ at 110° C., to thereby form a cured cholesteric liquid crystal layer B having a thickness of 2 μm.

Onto the cholesteric liquid crystal layer B, the cholesteric liquid crystal layer coating liquid C is applied by means of a bar coater, and is dried. Thereafter, the orientation thereof is matured at 110° C. for 20 seconds. It is then exposed to a ultra-high pressure mercury lamp having an exposure energy of 500 mJ/cm$^2$ at 110° C., to thereby form a cured cholesteric liquid crystal layer C having a thickness of 2 μm.

In the manner as mentioned above, there can be prepared a three-layered filter for an optical recording medium of Example 1, which has circular polarization separating property, and has the cholesteric liquid crystal layers each having mutually different a center wavelength of selective reflection, and all having the same clock-wise spiral direction.

—Preparation of the Optical Recording Medium—

The optical recording medium is prepared with a first substrate, a second substrate, a recording layer, and a filter layer.

As the second substrate, a conventional polycarbonate resin substrate for DVD+RW having a diameter of 120 mm, and a thickness of 0.6 mm is used. The servo pit pattern is formed on the whole surface of the second substrate, and the servo pit pattern has a track pitch of 1.6 μm, a pit depth of 100 nm, and a pit width of 1 μm.

A reflective film is formed on the surface of the servo pit pattern of the second substrate. As a reflective film material, aluminum (Al) is used. The Al reflective film is formed in accordance with DC magnetron sputtering method so as to have a thickness of 200 nm. Onto the thus prepared reflective film, a polycarbonate film having a thickness of 100 μm is bonded with a UV curable resin, as a first gap layer.

Thereafter, the filter for an optical recording medium is cut into a disk size so as to be able to dispose on the substrate. The filter is bonded to the substrate so as to make the base film side of the filter face to the servo pit pattern side of the substrate. The bonding can be performed by using a UV curable resin or a tackiness agent in a manner such that no air bubble is trapped between the filter and the substrate. In this way, the filter layer can be prepared.

As a material for the recording layer, a photopolymer coating liquid having the following composition is prepared.

—The Composition of the Photopolymer Coating Liquid—

| | |
|---|---|
| Di-(urethaneacrylate) oligomer (ALU-351, by Echo Resins Corp.) | 59 parts by mass |
| Isobornylacrylate | 30 parts by mass |
| Vinylbenzoate | 10 parts by mass |
| Polymerization initiator (Irga Cure 784, by Ciba Specialty Chemicals KK) | 1 part by mass |

The thus prepared photopolymer coating liquid is applied onto the filter layer by means of a dispenser. On the photopolymer, a first substrate formed of a polycarbonate resin, having a diameter of 12 cm and a thickness of 0.6 mm is disposed and pressed down, and then the edge of the disk and the first substrate are bonded with an adhesive.

The disk has a fringe portion at the edge thereof which makes the photopolymer layer have a thickness of 500 μm. By bonding the first substrate with the fringe portion, the thickness of the photopolymer layer is controlled, and any excessive photopolymer oozes out and is removed. In this way, the optical recording medium of Example 1 can be prepared. FIG. 7 is a schematic cross sectional diagram showing an embodiment similar to this example.

<Recording of the Location Information Pattern>

The thus obtained optical recording medium is set in an optical recording medium, the information and reference light each having the wavelength of 532 nm and the exposure energy of approximately 50 μJ/cm$^2$ are applied to the recording layer of the optical recording medium for 100 ns so as to record the information location pattern at three regions which are equally divided on the circumference of the recording layer. The location information pattern stores location information, e.g. (0001M), corresponded to the address information, e.g. (0001), formed in the servo pit pattern.

In Example 1, the horizontal location of the address information and the horizontal location of the location information are arranged to be matched, and the position information regarding the difference in the thickness direction of the recording layer is recorded as a pattern.

The recorded location information pattern is exposed with fixing light having a wavelength of 532 nm and the exposure energy of 100 mJ/cm$^2$ for 1 ms to thereby fix the location information pattern.

<Detection of Deviation ΔL of the Optical Axes of the Information Light and the Reference Light>

The servo light having a wavelength of 650 nm is applied to the thus obtained optical recording medium so as to perform a tracking servo. Under this condition, the information light and the reference light (light for reproducing the location information pattern) each having a wavelength of 532 nm are applied to the location information pattern, the reflected light therefrom is received, the light for reproducing the location information pattern is sifted to a location where the focus point is met, and detect the sifted amount relative to the horizontal location information as the deviation ΔL.

The deviation ΔL can be determined as a numerical value, such as (2 μm, 3 μm) from X-axis, and Y-axis, respectively, when the horizontal location information is determined as a starting point, and the X- and Y-axes are taken on a surface horizontal to the recording layer.

<Recording on the Recording Layer>

The deviation ΔL, i.e., (2 μm, 3 μm) from the X- and Y-axes, is determined as an offset amount. At the time of applying the information light and the reference light, the offset amount is considered, and the information light and the reference light are sifted their locations at 2 μm from the X-axis, and 3 μm from the Y-axis, and then applied.

Figure 14:
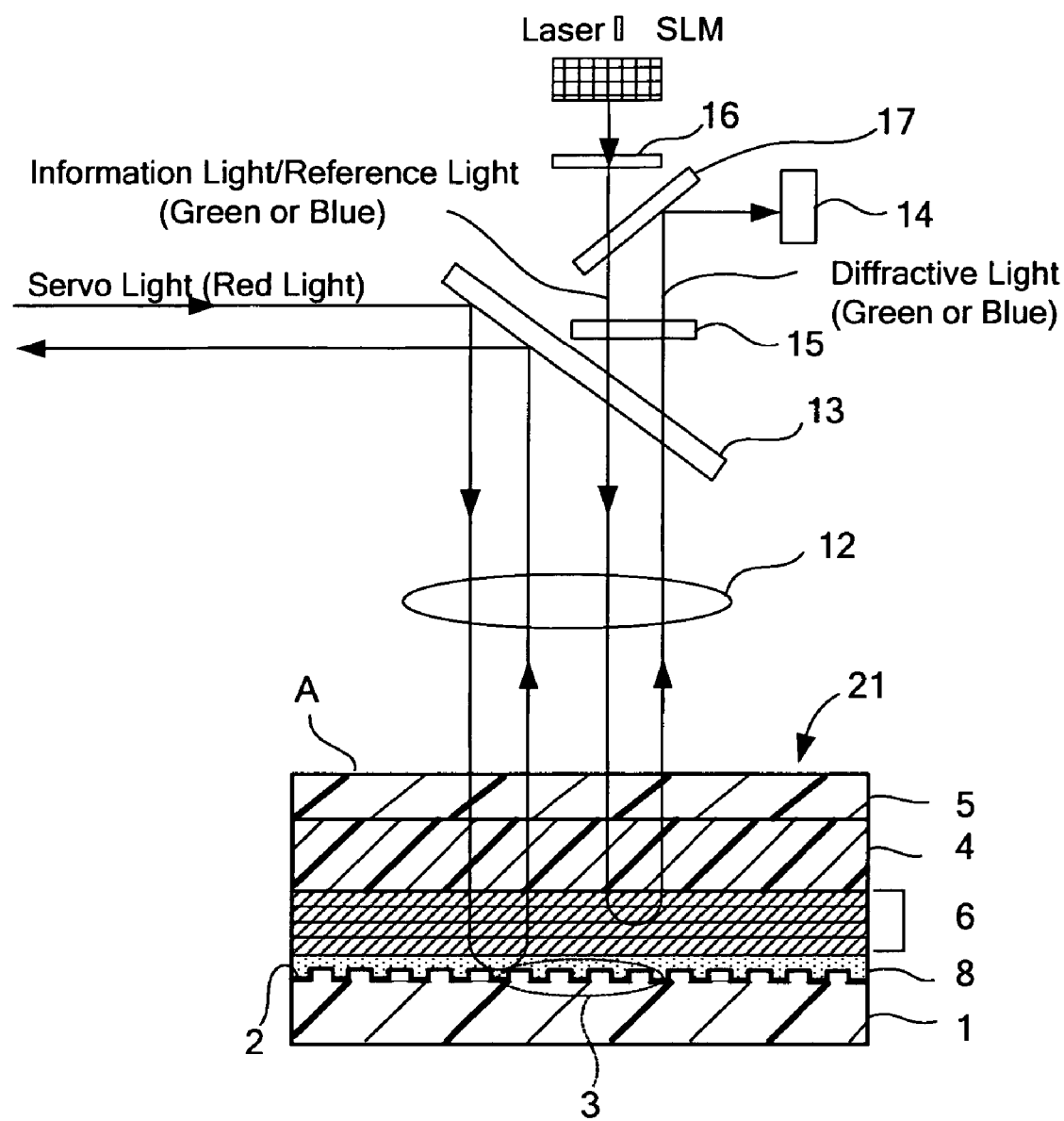
FIG. 14 is a conceptual vertical view showing an example of an optical system accompanying with an optical recording medium of the present invention.

The recording on the recording layer is performed as shown in FIG. 14, by applying the information light and the reference light for recording, each having the exposure energy of approximately 50 μJ/cm² to the recording layer 4 for 100 ns to form an interference image, and recording the interference image on the recording layer.

—Selective Reflectivity of the Optical Recording Medium—

The selective reflectivity of the thus obtained optical recording medium is measured by means of a spectral reflectometer (a beam oscillator: L-5662, a photo multi-channel analyzer: PMA-11, both manufactured by Hamamatsu Photonics KK).

As shown in FIG. 14, as information or reference light, a laser beam with wavelength at 532 nm is converted to a linearly polarized laser beam by the polarizing plate 16, and is further converted to a clockwise circular polarized laser beam by the quarter wave plate 15. Such the converted laser beam is applied to the optical recording medium as the information or reference light, and a laser beam having a wavelength of 650 nm is applied to the optical recording medium as servo light. As a result, it is confirmed that the servo light is reflected by a reflective film 2.

<Evaluation of the Reproducing Quality>

The evaluation of the reproducing quality of the recorded information is performed by means of the optical recording and reproducing apparatus 100 as shown in FIG. 15. In the evaluation, the reference light is applied to the optical recording medium so as to generate the diffracted light from the interference image, the diffracted light is read by means of a detector 14 shown in FIG. 14 so that the recorded information is reproduced, and hardly any error (spots and frames) is recognized.

According to the present invention, the problems in the related art can be solved, and there can be provided an excellent optical recording method, optical recording apparatus, optical recording medium, and optical reproducing method, which are capable of efficiently adjusting the deviation of the optical axes of a plurality of laser beams, e.g., servo light, information light, and reference light, caused by an error or the like of the optical recording, and optical reproducing apparatuses when recording, reproducing, focusing control or tracking control is performed by the plurality of laser beams.

The optical recording method and optical reproducing method of the present invention are excellent methods which are capable of efficiently adjusting the deviation of the optical axes of a plurality of laser beams, e.g., servo light, information light, and reference light, that is caused by an error or the like of the optical recording, and optical reproducing apparatuses when recording, reproducing, focusing control or tracking control is performed by the plurality of laser beams. The optical recording method and optical reproducing method of the present invention are suitably applied for a holographic optical recording and reproducing method capable of high density image recording.

The optical recording medium of the present invention can be widely used as an excellent optical recording medium which is capable of efficiently adjusting the deviation of the optical axes of a plurality of laser beams, e.g., servo light, information light, and reference light, that is caused by an error or the like of the optical recording, and optical reproducing apparatuses when recording, reproducing, focusing control or tracking control is performed by the plurality of laser beams.

The optical recording apparatus of the present invention is an excellent apparatus for holographic recording, which are capable of efficiently adjusting the deviation of the optical axes of a plurality of laser beams, e.g., servo light, information light, and reference light, that is caused by an error or the like when recording, reproducing, focusing control or tracking control is performed by the plurality of laser beams.

What is claimed is:

1. An optical recording method, comprising:
applying at least one of information light for recording and reference light for recording to a location information pattern in an optical recording medium so as to detect a horizontal location of an optical axis of at least one of the information light for recording and the reference light for recording relative to the optical recording medium;
detecting a deviation ΔL between the horizontal location of the optical axis of at least one of the information light for recording and the reference light for recording, and an address detected by servo light in a horizontal direction;
in the case where the deviation ΔL is more than 0, shifting at least one of the information light for recording and the reference light for recording at ΔL in the horizontal direction so that a location of the optical axis of at least one of the information light for recording and the reference light for recording is matched to a location of the address; and
applying the information light for recording and the reference light for recording to a recording layer of the optical recording medium so as to form an interference image, and recording the interference image on the recording layer,
wherein the optical recording medium comprises the recording layer for a holographic recording, and the location information pattern which stores horizontal location information relative to a surface of the recording layer.

2. The optical recording method according to claim 1, wherein the location information pattern is formed in at least three regions of the optical recording medium.

3. The optical recording method according to claim 1, wherein the location information pattern is recorded on the recording layer.

4. The optical recording method according to claim 1, wherein, in the step of said applying at least one of information light for recording and reference light for recording, the detection of the horizontal location of the optical axis is performed in accordance at least one method selected from the group consisting of a three-beam method, a push-pull method, and a differential phase detection method.

5. The optical recording method according to claim 1, wherein, in the step of said applying at least one of information light for recording and reference light for recording, the detection of the horizontal location of the optical axis is performed by applying at least one of the information light for recording and the reference light for recording to the location information pattern, receiving reflected light therefrom, and detecting a location where a signal intensity of the reflective light becomes maximum.

6. The optical recording method according to claim 1, wherein, in the step of said applying at least one of information light for recording and reference light for recording, the detection of the horizontal location of the optical axis is performed by applying at least one of the information light for recording and the reference light for recording to the location information pattern, receiving reflected light therefrom, and detecting a location where a signal error of the reflected light becomes minimum.

7. The optical recording method according to claim 1, wherein the optical recording medium further comprises a first substrate, a filter Layer, and a second substrate, and wherein the first substrate, the recording layer, the filter layer, and the second substrate are disposed in this order.

8. The optical recording method according to claim 1, wherein the optical recording medium is either a reflective holographic recording medium or a transmission holographic recording medium.

9. The optical recording method according to claim 1, wherein the applying the information light for recording and the reference light for recording is performed in a manner that an optical axis of the information light for recording and an optical axis of the reference light for recording are collinearly aligned.

10. An optical recording apparatus, comprising:
a deviation detecting unit which is configured to apply at least one of information light for recording and reference light for recording to a location information pattern in an optical recording medium so as to detect a horizontal location of an optical axis of at least one of the information light for recording and the reference light for recording relative to the optical recording medium, and is configured to detect a deviation $\Delta L$ between the horizontal location of the optical axis of at least one of the information light for recording and the reference light for recording and an address detected by servo light in a horizontal direction;
a horizontal location controlling unit which is configured to control a horizontal location of the optical axes of the information light for recording and the reference light for recording based upon the detected derivation $\Delta L$; and
an interference image recording unit which is configured to apply the information light for recording and the reference light for recording to a recording layer of the optical recording medium at the location controlled by the horizontal location controlling unit so as to form an interference image, and is configured to record the interference image on the recording layer,
wherein the optical recording medium comprises the recording layer for a holographic recording, and the location information pattern which stores horizontal location information relative to a surface of the recording layer.

11. An optical recording medium, comprising:
a recording layer for a holographic recording; and
a location information pattern which stores horizontal location information relative to a surface of the recording layer,
wherein the recording layer records an interference image, which is recorded by a method comprising:
applying at least one of information light for recording and reference light for recording to the location information pattern so as to detect a horizontal location of an optical axis of at least one of the information light for recording and the reference light for recording relative to the optical recording medium;
detecting a deviation $\Delta L$ between the horizontal location of the optical axis of at least one of the information light for recording and the reference light for recording and an address detected by servo light in a horizontal direction;
in the case where the deviation $\Delta L$ is more than 0, shifting at least one of the information light for recording and the reference light for recording at $\Delta L$ in the horizontal direction so that a location of the optical axis of at least one of the information light for recording and the reference light for recording is matched to a location of the address; and
applying the information light for recording and the reference light for recording to the recording layer so as to form the interference image, and recording the interference image on the recording layer.

12. The optical recording medium according to claim 11, wherein the optical recording medium comprises the location information pattern at least in three regions thereof.

13. The optical recording medium according to claim 11, wherein the recording layer comprises the location information pattern.

14. The optical recording medium according to claim 11, further comprising a first substrate, a filter layer, and a second substrate,
wherein the first substrate, the recording layer, the filter layer, and the second substrate are disposed in this order.

15. The optical recording medium according to claim 14, wherein the filter layer is an inorganic filter layer which comprises a colored material-containing layer, and a dielectric material-deposited layer.

16. The optical recording medium according to claim 14, wherein the filter layer is an organic filter layer which comprises a cholesteric liquid crystal layer.

17. The optical recording medium according to claim 11, wherein the recording layer comprises a photopolymer.

18. The optical recording medium according to claim 17, wherein the photopolymer comprises a monomer, and a photoreaction initiator.

19. An optical reproducing method, comprising:
applying reference light to an interference image recorded on a recording layer of an optical recording medium so as to reproduce recorded information corresponding to the interference image,
wherein the optical recording medium comprises the recording layer, and a location information pattern which stores horizontal location information relative to a surface of the recording layer,
wherein the interference image is recorded on the recording layer of the optical recording medium by a method comprising:
applying at least one of information light for recording and reference light for recording to the location information pattern so as to detect a horizontal location of an optical axis of at least one of the information light for recording and the reference light for recording relative to the optical recording medium;
detecting a deviation $\Delta L$ between the horizontal location of the optical axis of at least one of the information light for recording and the reference light for recording and an address detected by servo light in a horizontal direction;
in the case where the deviation $\Delta L$ is more than 0, shifting at least one of the information light for recording and the reference light for recording at $\Delta L$ in the horizontal direction so that a location of the optical axis of at least one of the information light for recording and the reference light for recording is matched to a location of the address; and
applying the information light for recording and the reference light for recording to the recording layer so as to form the interference image, and recording the interference image on the recording layer.

20. The optical reproducing method according to claim 19, wherein the reference light for recording is applied at the same angle to an incident angle of the reference light for recording applied at the time of recording the interference image so as to reproduce the recorded information.

* * * * *